United States Patent
Wang et al.

(10) Patent No.: US 11,709,527 B2
(45) Date of Patent: Jul. 25, 2023

(54) MODULARIZED COMPUTING AND INPUT DEVICES

(71) Applicant: Apple Inc., Cupertino, CA (US)

(72) Inventors: Paul X. Wang, Cupertino, CA (US);
Keith J. Hendren, San Francisco, CA (US); Nicholas L. Qu, Vancouver (CA); Dinesh C. Mathew, Cupertino, CA (US); Adam T. Garelli, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/359,251

(22) Filed: Jun. 25, 2021

(65) Prior Publication Data
US 2022/0035420 A1 Feb. 3, 2022

Related U.S. Application Data

(60) Provisional application No. 63/059,141, filed on Jul. 30, 2020.

(51) Int. Cl.
*G06F 1/16* (2006.01)
*G06F 3/041* (2006.01)
*G06F 3/044* (2006.01)

(52) U.S. Cl.
CPC .......... *G06F 1/1681* (2013.01); *G06F 1/1647* (2013.01); *G06F 1/1654* (2013.01); *G06F 1/1669* (2013.01); *G06F 3/044* (2013.01); *G06F 3/0412* (2013.01)

(58) Field of Classification Search
CPC .... G06F 1/1681; G06F 1/1647; G06F 1/1654; G06F 1/1669; G06F 3/0412; G06F 3/044
See application file for complete search history.

(56) References Cited

U.S. PATENT DOCUMENTS

| | | |
|---|---|---|
| 5,100,098 A | 3/1992 | Hawkins |
| 5,224,060 A | 6/1993 | Ma |
| 5,229,757 A | 7/1993 | Takamiya et al. |
| 5,235,495 A | 8/1993 | Blair et al. |
| 5,247,285 A | 9/1993 | Yokota et al. |

(Continued)

FOREIGN PATENT DOCUMENTS

| | | |
|---|---|---|
| TW | 201413418 A | 4/2014 |
| WO | 2020055432 A1 | 3/2020 |

OTHER PUBLICATIONS

European Search Report for European Application No. 2118558.7 dated Dec. 15, 2021.

*Primary Examiner* — Peter D Mcloone
(74) *Attorney, Agent, or Firm* — Dorsey & Whitney LLP

(57) ABSTRACT

A computing device can be reconfigurable to include one or more electrical devices in various configurations. The computing device can include a base forming an input surface configured to receive user input. The base can receive one or more input devices, such as, displays or keyboards. The base can include a hinge rotatably attached to the base and configured to removably retain an electronic device, such as, a display. The computing device can include a coupling mechanism having a first retaining portion and a second retaining portion rotatably coupled to an intermediate portion. The first and second retaining portions can be configured to removably retain electrical devices to the coupling mechanism.

19 Claims, 19 Drawing Sheets

(56) References Cited

U.S. PATENT DOCUMENTS

| | | | |
|---|---|---|---|
| 5,268,817 A | 12/1993 | Miyagawa et al. | |
| 5,276,589 A | 1/1994 | Bartlett et al. | |
| 5,293,300 A | 3/1994 | Leung | |
| 5,337,212 A | 8/1994 | Bartlett et al. | |
| 5,375,076 A | 12/1994 | Goodrich et al. | |
| 5,559,670 A | 9/1996 | Flint et al. | |
| 6,005,767 A | 12/1999 | Ku et al. | |
| 6,636,420 B2 | 10/2003 | Nakano et al. | |
| 6,665,175 B1 | 12/2003 | Deboer et al. | |
| 6,700,773 B1 | 3/2004 | Adriaansen et al. | |
| 7,106,578 B2 | 9/2006 | Chen | |
| 7,156,351 B2 | 1/2007 | Wang et al. | |
| 7,283,355 B2 | 10/2007 | Han | |
| 7,391,606 B2 | 6/2008 | Chen et al. | |
| 7,436,655 B2 | 10/2008 | Homer et al. | |
| 7,787,242 B2 | 8/2010 | Schwager et al. | |
| 7,869,200 B2 | 1/2011 | Horie | |
| 7,898,796 B2 | 3/2011 | Horie | |
| 8,081,429 B2 | 12/2011 | Horie | |
| 8,259,437 B2 | 9/2012 | Vesely | |
| 8,302,488 B2 | 11/2012 | Hsu et al. | |
| 8,514,567 B2 | 8/2013 | Shin et al. | |
| 8,576,563 B2 | 11/2013 | Yang et al. | |
| 10,253,536 B1* | 4/2019 | Zaloom | G06F 1/1679 |
| 10,466,749 B1 | 11/2019 | Hendren et al. | |
| 2001/0016508 A1 | 8/2001 | Kido et al. | |
| 2005/0063145 A1 | 3/2005 | Homer et al. | |
| 2005/0105264 A1 | 5/2005 | Chen | |
| 2006/0050471 A1 | 3/2006 | Chen | |
| 2006/0050472 A1 | 3/2006 | Chen | |
| 2006/0077623 A1 | 4/2006 | Yeh | |
| 2006/0082957 A1 | 4/2006 | Chen | |
| 2006/0256512 A1 | 11/2006 | Esther | |
| 2007/0008685 A1 | 1/2007 | Hsiung | |
| 2007/0159781 A1 | 7/2007 | Zbikowski | |
| 2007/0235370 A1 | 10/2007 | Reale | |
| 2009/0296335 A1 | 12/2009 | Cheng et al. | |
| 2010/0124009 A1 | 5/2010 | Jiang et al. | |
| 2010/0220441 A1 | 9/2010 | Berlekamp | |
| 2011/0051349 A1 | 3/2011 | Daley | |
| 2013/0107427 A1 | 5/2013 | Cheng | |
| 2014/0085814 A1 | 3/2014 | Kielland | |
| 2014/0152571 A1 | 6/2014 | Ishikawa | |
| 2014/0211394 A1* | 7/2014 | Lin | G06F 1/1647 361/679.17 |
| 2014/0347814 A1* | 11/2014 | Zaloom | G06F 1/1626 248/688 |
| 2017/0152990 A1 | 6/2017 | Kielland | |
| 2018/0210498 A1 | 7/2018 | Ishikawa et al. | |
| 2020/0097048 A1 | 3/2020 | Hendren et al. | |
| 2020/0192430 A1* | 6/2020 | McKittrick | H01M 10/647 |
| 2020/0241604 A1* | 7/2020 | Nakamura | G06F 1/1618 |
| 2020/0343057 A1* | 10/2020 | Files | G06F 1/3287 |
| 2021/0313750 A1* | 10/2021 | Liu | H01R 35/02 |

* cited by examiner

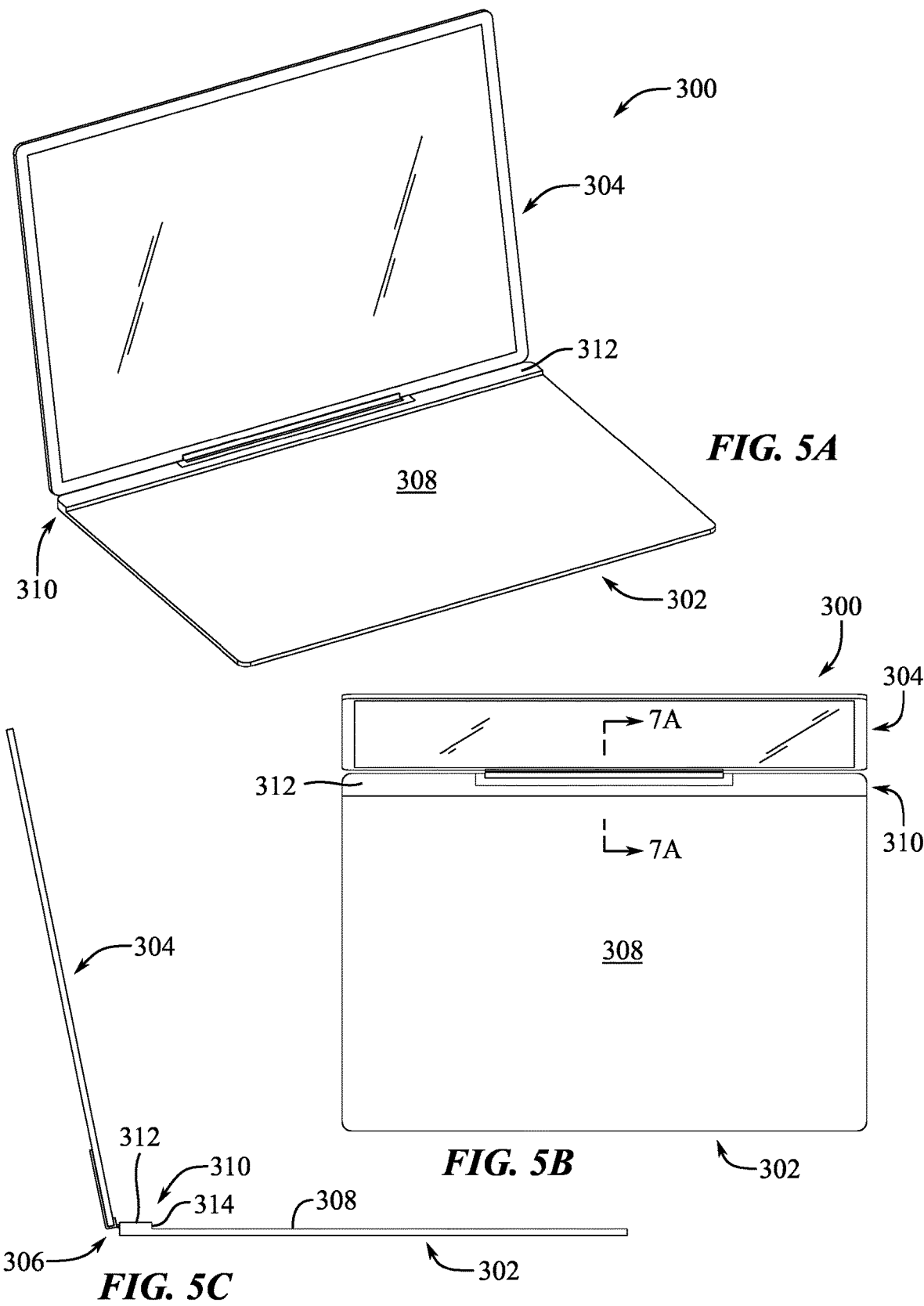

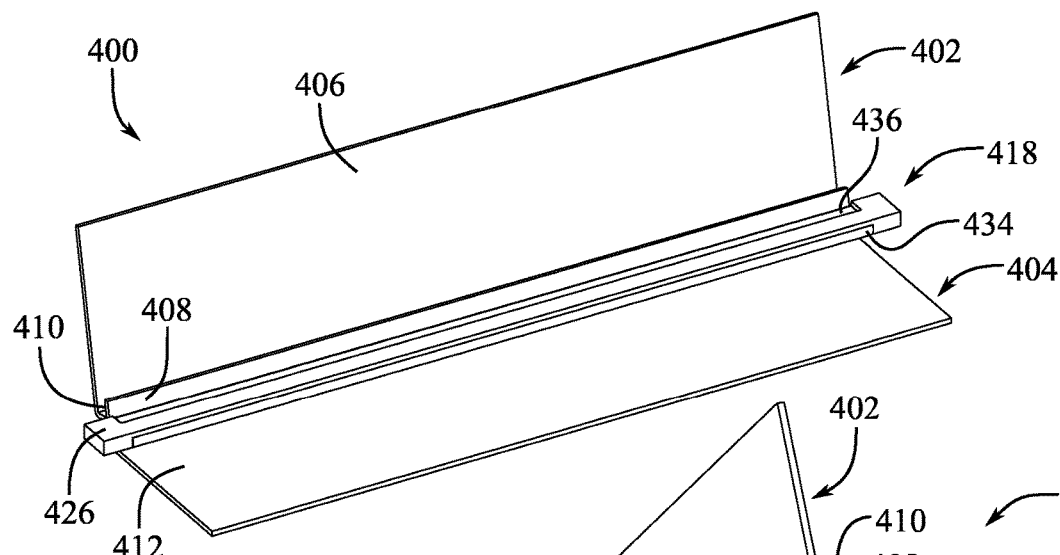
*FIG. 8A*
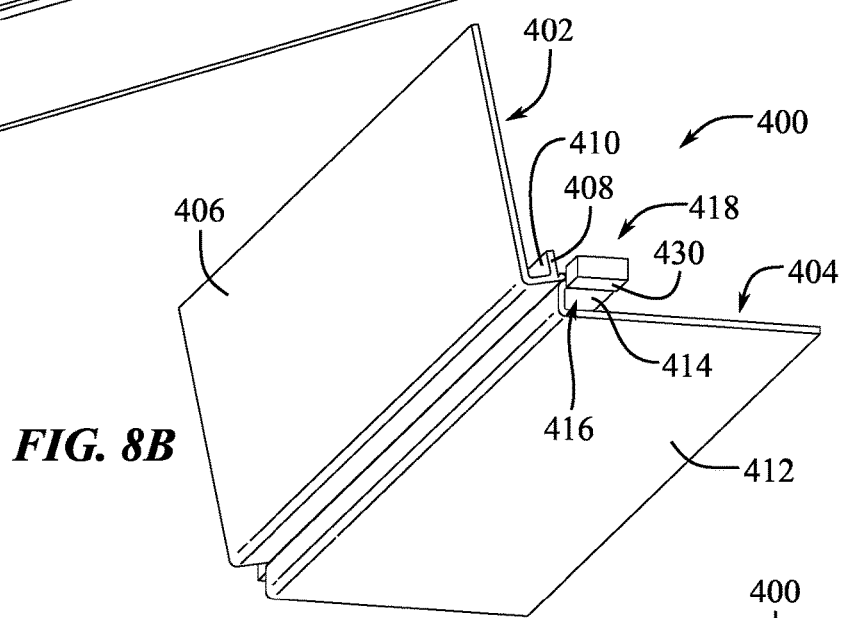
*FIG. 8B*
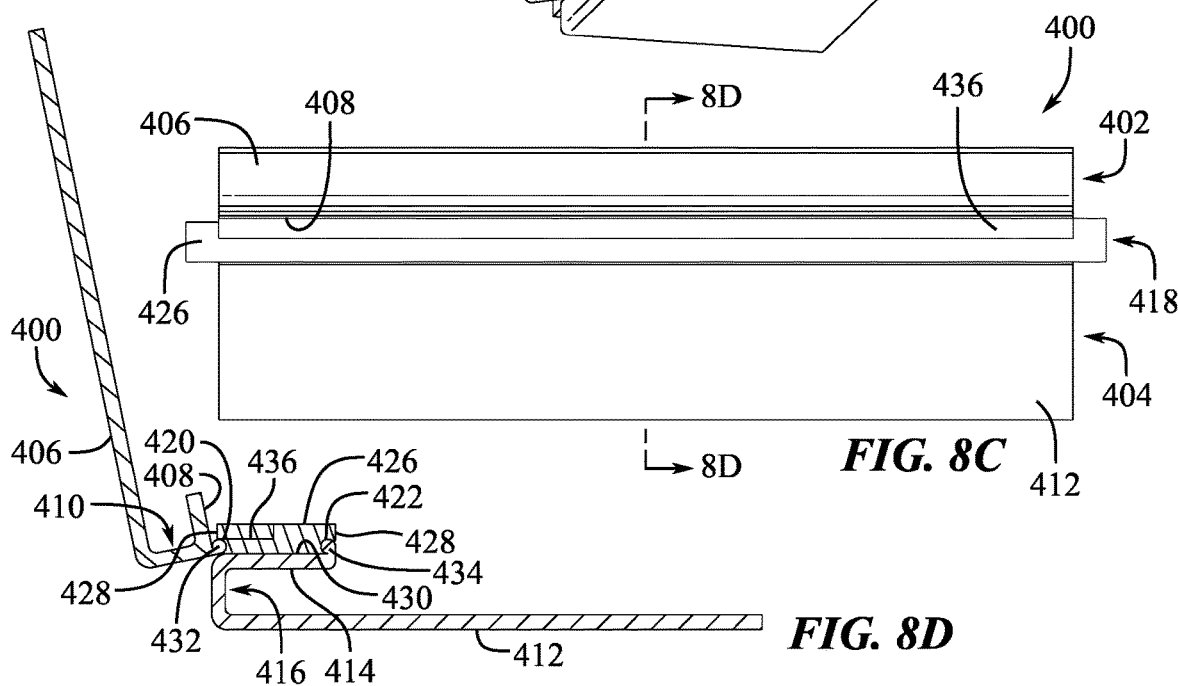
*FIG. 8C*
*FIG. 8D*

MODULARIZED COMPUTING AND INPUT DEVICES

CROSS-REFERENCE TO RELATED APPLICATION(S)

This claims priority to U.S. Provisional Patent Application No. 63/059,141, filed 30 Jul. 2020, and entitled "MODULARIZED COMPUTING AND INPUT DEVICES," the entire disclosure of which is hereby incorporated by reference.

FIELD

The described examples relate generally to computing devices. More particularly, the present examples relate to modularized computing devices having removably attached components.

BACKGROUND

The components of computing devices, including housings for computing devices, can be designed or formed for specific purposes. Large or bulky components have traditionally been used to achieve a desired level of performance in a computing device, such as a desired amount of memory, a desired level of computing power, or a desired manner of user input. Housings for such computing devices were thus constrained to designs including relatively large or uninterrupted internal volumes. Other performance requirements for the computing devices also often limited the housings to certain form factors.

Recent advances in computing devices have provided for the miniaturization or reduction in size of the components, such as computing components, used to power and drive the devices, such as processors, batteries, memory, and integrated circuits. As a result, computing devices having different form-factors have been adopted to provide efficient platforms for a particular use or in a particular environment. For example, laptop and tablet computing devices are commonly used when mobility is desired, such as, reading news articles on a bus or a park bench. Alternatively, desktop computing devices are commonly desired when a user wants a larger display and/or a full-size keyboard. While computing devices have traditionally been constructed to fit the needs of a single particular use (e.g., sketching, virtual and artificial reality applications, reading social media, etc.), reconfigurable computing devices can be desirable to provide a higher quality user experience within a broad spectrum of uses and environments.

SUMMARY

An example computing device can include a base or body defining an input surface and an internal volume. The computing device can include a plurality of sensors disposed within the internal volume. The computing device can include a hinge including a retaining portion and a pivot member. The retaining portion can include first and second walls defining a channel. The pivot member can rotatably attach to the base and can be positioned between the retaining portion and the base. The computing device can include a display removably attached to the hinge.

In some examples, the first wall can define a window, and a portion of the display can be visible by a user through the window. The computing device can further include a keyboard removably attached to the input surface. The keyboard can overlay at least a portion of the input surface. The computing device can include a second display removably attached to the input surface. The second display can overlay at least a portion of the input surface. The base can include one or more magnets to align the keyboard or the second display on the input surface. The base can form a raised portion that acts as a datum to align the keyboard or the second display on the input surface. The plurality of sensors can additionally, or alternatively, be disposed within the raised portion and configured to detect capacitive touch at or near the input surface.

In some examples, the computing device can include a battery, a processor, and memory disposed within the internal volume. At least one of the plurality of sensors can be configured to detect a position and a motion of an extremity of a user in a region adjacent to the input surface and communicate with the processor in response to the detected motion or position. The computing device can include a power supply disposed within the base. The power supply can include an inductive charging coil. The computing device can include a projector to project a desired image onto the input surface or elsewhere.

Another aspect of the present disclosure relates to a hinge for an electronic device. The hinge can include a retaining portion having a first wall and a second wall. The first and second walls can form at least a portion of a channel. The hinge can include a pivot member rotatably attached to the retaining portion.

In some examples, at least one of the first or second walls can define a window. At least one of the first or second walls can include a sub-display. The pivot member can define an axis and an electronic device coupled to the hinge can be pivotable about the axis. The hinge can include one or more magnets configured to retain an electronic device within the retaining portion. A height of the first wall can be larger than a height of the second wall.

Another aspect of the present disclosure relates to a coupling mechanism for interconnecting electronic devices. The coupling mechanism can include a first retaining portion, a second retaining portion, and an intermediate portion. The intermediate portion can be positioned between the first and second retaining portions. Each of the first and second retaining portions can be pivotable relative to the intermediate portion. Each of the first and second retaining portions can include a first wall, a second wall, a channel at least partially defined by the first and second walls, and a pivot member. The pivot member can be rotatably attached to the intermediate portion.

In some examples, at least one of the first or second side walls can define a window, and at least a portion of a display interconnected to the coupling mechanism can be visible through the window. At least one of the first or second walls can include a sub-display. The pivot member can define an axis and an electronic device interconnected to the coupling mechanism can be pivotable about the axis. The coupling mechanism can include one or more magnets configured to retain an electronic device within the first retaining portion or the second retaining portion. The electronic devices can include a pair of tablet computing devices or a keyboard and a single computing device.

BRIEF DESCRIPTION OF THE DRAWINGS

The disclosure will be readily understood by the following detailed description in conjunction with the accompanying drawings, wherein like reference numerals designate like structural elements, and in which:

FIG. 5A shows a perspective view of a computing device.

FIG. 5B shows a top view of the computing device of FIG. 5A.

FIG. 5C shows a side view of the computing device of FIG. 5A.

FIG. 8A shows a perspective view of a computing device.

FIG. 8B shows a rear perspective view of computing device of FIG. 8A.

FIG. 8C shows a top view of the computing device of FIG. 8A.

FIG. 8D shows a sectional view of computing device of FIG. 8A.

DETAILED DESCRIPTION

Figure 1A:
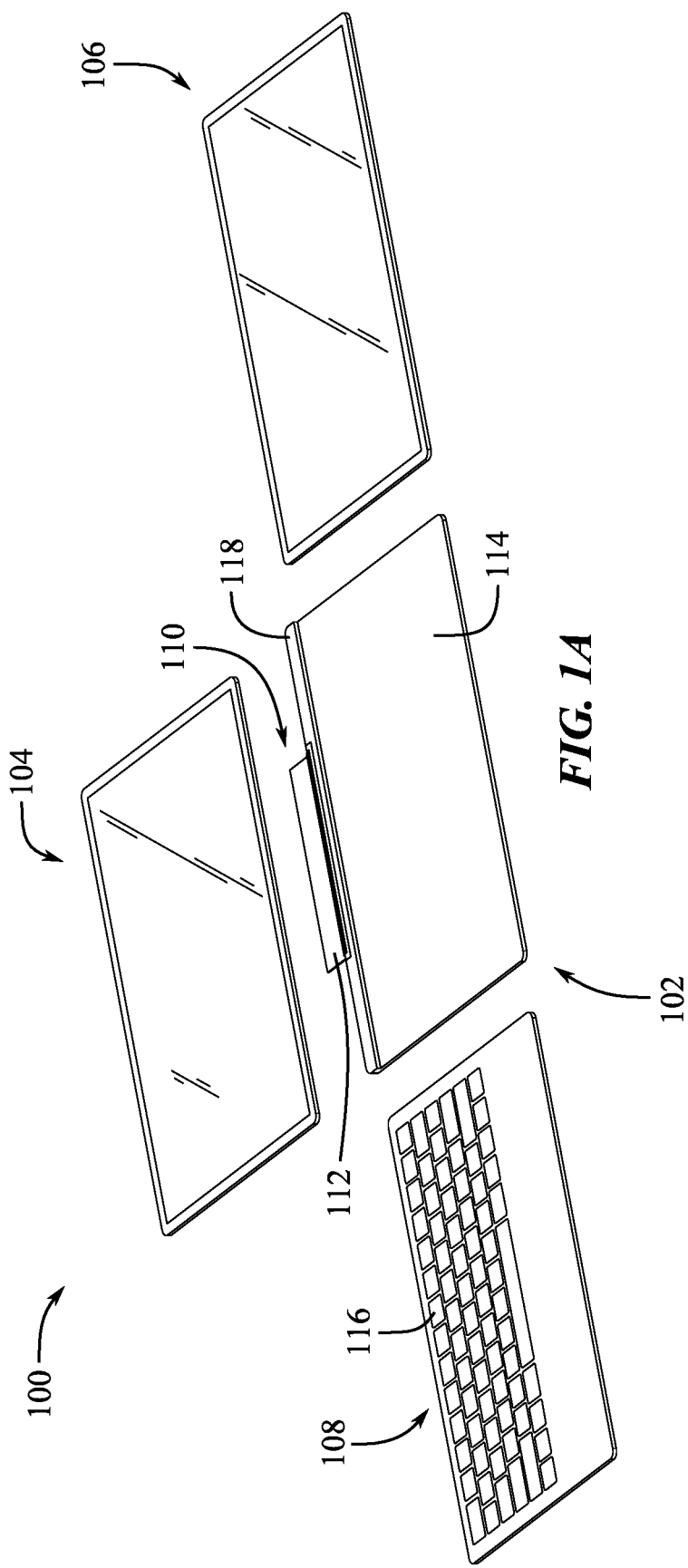
FIG. 1A shows a perspective view of components of a computing device.

The present description provides examples, and is not limiting of the scope, applicability, or configuration set forth in the claims. Thus, it will be understood that changes can be made in the function and arrangement of elements discussed, without departing from the spirit and scope of the disclosure, and various examples can omit, substitute, or add other procedures or components, as appropriate. Also, features described with respect to some examples can be combined in other examples.

Traditionally, computing devices can include tablet computing devices, laptop computing devices, and desktop computing devices. Tablet computing devices can resemble a display screen configured to display content to a user of the device while also being capable of receiving touch input from the user. Laptop computing devices generally assume a clamshell configuration having a display portion and a keyboard portion pivotably coupled together. Desktop computing devices generally include a distinct display (i.e., monitor), a keyboard, and a tower. While each of these types of computing devices effectively provide a quality user experience in particular environments, it can be desirable to be able to reconfigure these devices to operate effectively in a broad spectrum of applications in various environments. Thus, with traditional computing devices, users may need to rely on multiple distinct computing devices to sufficiently meet their varied needs.

In some examples, the computing devices described herein can be modular or reconfigurable to provide improved functionality in a variety of uses and environments. In some examples, a computing device can include a base and a hinge operably coupled to the base. The hinge can be rotatably attached to the base and can be configured to receive and retain a component or an electronic device (e.g., a display) to the base. The base can define an input surface in communication with one or more sensors to detect touch, or near touch, input at the input surface. Additionally or alternatively, the one or more sensors can detect movement of an object above the input surface, such as a gesture from the hand of a user of the computing device.

In some examples, one or more devices or components can be placed adjacent to the input surface, such as a keyboard positioned on the input surface. In some examples, the keyboard can have electronics or mechanisms for receiving input from a user and can communicate that input to the base. In other examples, the keyboard can include a mat having indicia which mark the boundaries of keys, but does not include any electronics or mechanisms to provide input to the input surface of the base. Instead, the one or more sensors within the base can detect input through or at the mat such that the keyboard can function as a guide or pattern for a user outlining boundaries for user input associated with specific keys of the keyboard. In some examples, one or more other input devices can be positioned at the input surface of the base, such as, one or more displays, knobs, switches, buttons, turntables, or other input devices.

In some examples, the computing device can include a coupling mechanism configured to interconnect multiple electronic devices or components. The coupling mechanism can include first and second retaining portions rotatably attached to an intermediate portion. Each of the retaining portions can receive an electronic device within a channel defined by one or more walls.

The computing devices described herein can include a variety of designs and configurations to accommodate various uses. Such computing devices can be modular and can include multiple displays, multiple input devices, or combinations thereof that can be selectively coupled to a base, a hinge, or a coupling mechanism, as desired. This arrangement can provide for a variety of different and novel configurations for utilizing the computing devices described herein.

These and other examples are discussed below with reference to FIGS. 1A-16C. However, those skilled in the art will readily appreciate that the detailed description given herein with respect to these figures is for explanatory purposes only and should not be construed as limiting.

FIG. 1A shows an example of a computing device 100 as discussed herein, including a base 102, a first display 104, a second display 106, and a keyboard 108. One or more of the first display 104, the second display 106, and the keyboard 108 can be combined in various configurations with the base 102, for example, by removably coupling therewith. In some examples, the base 102, the first display 104, the second display 106, and the keyboard 108 can all be considered parts of the computing device 100, although in some examples, the base 102 alone can be referred to as the computing device 100 and the first display 104, the second display 106, and the keyboard 108 can be referred to as components, input components, device, or electronic devices.

The base 102 can include a hinge 110 having a retaining portion 112 configured to removably retain an electronic device (e.g., the first or second displays 104, 106) to the base 102. In some examples, the electronic device can be at least partially retained within a channel formed by the retaining portion 112. The electronic device can be at least partially retained on or in the retaining portion 112 by a magnetic force coupling the electronic device to the retaining portion 112. For example, the retaining portion 112 can be magnetic or can include one or more magnets or electromagnets which exert a force on a corresponding magnet or ferromagnetic material in the electronic device to retain a portion of the housing of the electronic device to the hinge 110. The hinge 110 can be rotatably or otherwise moveably coupled to the base 102 such that an electronic device coupled to the retaining portion 112 can pivot or move relative to the base 102.

The base 102 can define an input surface 114 (e.g., an upper most surface or top surface of the base 102). The input surface 114 can receive input from a user of the computing device 100. For example, the base 102 can include one or more sensors, disposed within an internal volume defined by the base 102, to detect user input at or near the input surface 114 (see FIGS. 7A and 7B and their related disclosure herein). Alternatively or additionally, an input device (e.g., the first or second displays 104, 106, or the keyboard 108) can be positioned and/or retained on the input surface 114 to enable a user to provide input to the computing device 100.

The first display 104 can be any form of display, component, or device used to display visual content to a user. For example, the first display 104 can be an LED display, an OLED display, or an LCD display. In some examples, the first display 104 can be any form of display now known in the art, or as may be developed in the future. In some examples, the first display 104 can be a touch screen display, or can have touch detecting capabilities, such as, capacitive touch, force touch, and near touch capabilities. In some examples, however, the computing device 100 can be capable of detecting a user's touch and/or a position of an appendage of the user by components other than the first display 104. In some examples, the first display 104 can also function as a standalone computing device, such as a traditionally configured tablet computer, when not retained on the base 102. In some examples, the first display 104 can communicate with the base 102, and computing components in the base 102 can provide signals to the first display 104 regardless of whether the first display 104 is retained on the base 102.

The second display 106 can be substantially similar to, and can include some or all of the features of the first display 104. In some examples, the second display 106 can be any form of display, component, or device used to display visual content to a user. For example, in some examples the second display 106 can be an LED display, an OLED display, or an LCD display. In some examples, the second display 106 can be any form of display now known in the art, or as may be developed in the future. In some examples, the second display 106 can be a touch screen display, or can have touch detecting capabilities, such as, capacitive touch, force touch, and near touch capabilities. In some examples, however, the computing device 100 can be capable of detecting a user's touch and/or a position of an appendage of the user by components other than the second display 106.

As described herein, and as shown in the associated figures, the first and second displays 104, 106 can be removably coupled to, or otherwise positioned about, the base 102 to provide various configurations of the computing device 100. As a result, one or both of the first and second displays 104, 106 can be utilized to form the computing device 100. Although a respective display (e.g., the first display 104) may be referred to in a particular example, another display (e.g., the second display 106) can be equally as applicable within the example. Moreover, while the size and aesthetic features of the second display 106 are illustrated as identical to the first display 104 in the figures, the second display 106 can differ in size, aesthetic features, and functionality from the first display 104.

In some examples, the keyboard 108 can include one or more keys 116. A user can provide input to the computing device 100 by pressing one or more of the keys 116. Each of the keys 116 can include a respective indicia or symbol printed, etched, or otherwise provided on a surface of the key 116 to form an alphanumeric keyboard (e.g., a QWERTY type keyboard, etc.). Additionally or alternatively, one or more of the keys 116 can alter or vary operational aspects of the computing device 100, for example, by adjusting an intensity of a backlight behind the keys 116 or by varying a magnitude of volume emitted from a speaker (not shown) housed within the first or second display 104, 106, and/or the base 102.

While the figures illustrate the keyboard 108 as having a particular quantity of keys 116, each having particular sizes and shapes, the quantity of keys 116 and the particular sizes and shapes of the keys 116 can vary from one example to another. Moreover, the position of each key 116 on the keyboard 108 can be varied to accommodate other input mechanisms on the keyboard 108, such as a track pad, touch screen, or other input surface or component. Furthermore, each key 116 can be configured to receive multiple kinds of input. In some examples, the key 116 can be actuated or receive force from a user which vertically displaces the key 116. Additionally or alternatively, the key 116 can receive a touch input at a surface thereof to provide a track pad or touch pad utility. For example, a touch input at the surface of the key 116 can control or operate a cursor displayed at an electronic device (e.g., first and/or second displays 104, 106) operably coupled to the computing device 100. In some examples, the key 116 can be configured to receive multi-touch input at the surface of the key 116 to enable additional operational features for a user of the computing device 100, such as, pinch, zoom, and rotate features that enable the user to manipulate a view displayed on the electronic device.

In some examples, the keyboard 108 can include electrical and/or mechanical components which enable the keys 116 to be physically actuated or otherwise receive input from a user of the computing device 100. In such examples, the keyboard 108 can include a set of key mechanisms and or a set of sensors. Each key mechanism of the set of key mechanisms can include a key cap, a support structure, and a biasing component. Each sensor of the set of sensors can be configured to detect a capacitive touch or near touch at a surface of the keyboard 108.

In other examples, the keyboard 108 can be devoid of some or all electrical and mechanical components such that only the one or more sensors disposed within the base 102 detect input at the keyboard 108. In such examples, the keyboard 108 can be a mat or a pad that provides the user with a reference or a pattern identifying the boarders and relative size of each key 116, but the keyboard 108 does not provide any input to the base 102. In other words, the one or more sensors within the base 102 can detect input through the keyboard 108, which acts as a guide for the user of the computing device by outlining various input regions and key boundaries.

Figure 1B:
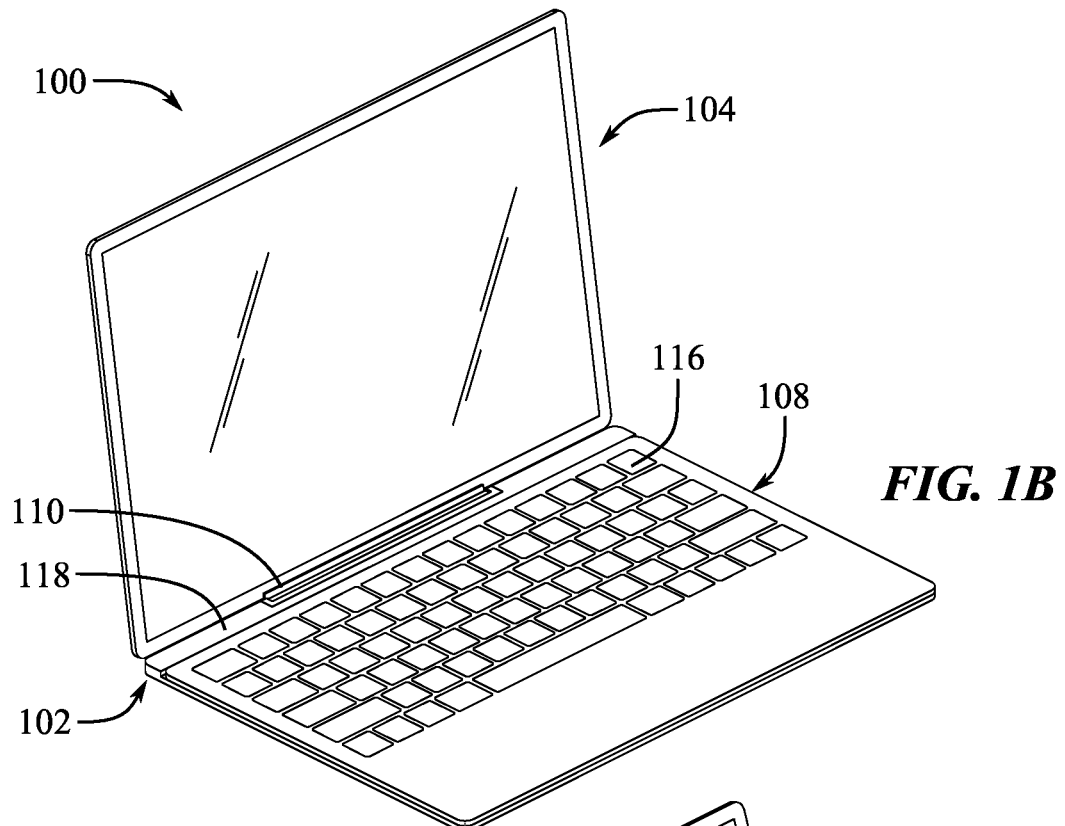
FIG. 1B shows a perspective view of the computing device of FIG. 1A arranged in a configuration.

FIG. 1B illustrates a perspective view of the computing device 100 arranged in a first configuration, wherein the first display 104 is removably attached to the hinge 110 and the keyboard 108 is positioned on or adjacent the input surface 114. While coupled or affixed to the base 102, the first display 104 can be in electrical communication with one or more computing components within the base 102, other components within the base 102 (e.g., a power source), the keyboard 108, an accessory device (e.g., a stand-alone track pad), or a combination thereof. For example, the retaining portion 112 can form an electrically conductive pathway configured to receive and/or transmit data and/or power from the first display 104, and to distribute the data to one or more of the components described above. Likewise, the retaining portion 112 can be configured to transfer or deliver data and/or power to the first display 104 from one or more of the components described above. In some examples, the first display 104 can wirelessly transmit and/or receive data and/or power from the base 102. In some examples, the base 102 and/or first display 104 can contain wireless charging components, such as inductive charging components. In some examples, the base 102 and/or the display 104 can include one or more wireless antennas, such as WIFI, Bluetooth, cellular, LTE, or any other form of wireless antenna.

Like the first display 104, while coupled or affixed to the input surface 114, the keyboard 108 can also be placed in wireless and/or electrical communication with one or more computing components within the base 102, other components within the base 102 (e.g., a power source), the first display 104, an ancillary device (e.g., a stand-alone track pad), or a combination thereof. For example, the keyboard 108 can wirelessly transfer data to the base 102 or other component as a result of user input received at the keyboard 108 (e.g., actuation of a key 116). The keyboard 108 can be aligned and affixed to the base 102, for example, using one or more magnets within the base 102 and/or the keyboard 108. In some examples, the base 102 can form or define a raised portion 118 that can act as a datum for aligning the keyboard 108 relative to the input surface 114. Additionally, or alternatively, a bottom surface (e.g., a surface of the keyboard 108 which interfaces with the base 102 and/or the input surface 114) can have a relatively high coefficient of friction to limit or prevent the keyboard 108 from sliding or moving on the base 102 while receiving input. For example, a surface of the keyboard 108 and/or the input surface 114 can include a coating or material having a relatively high coefficient of friction, such as a polymeric or rubberized material.

Figure 1C:
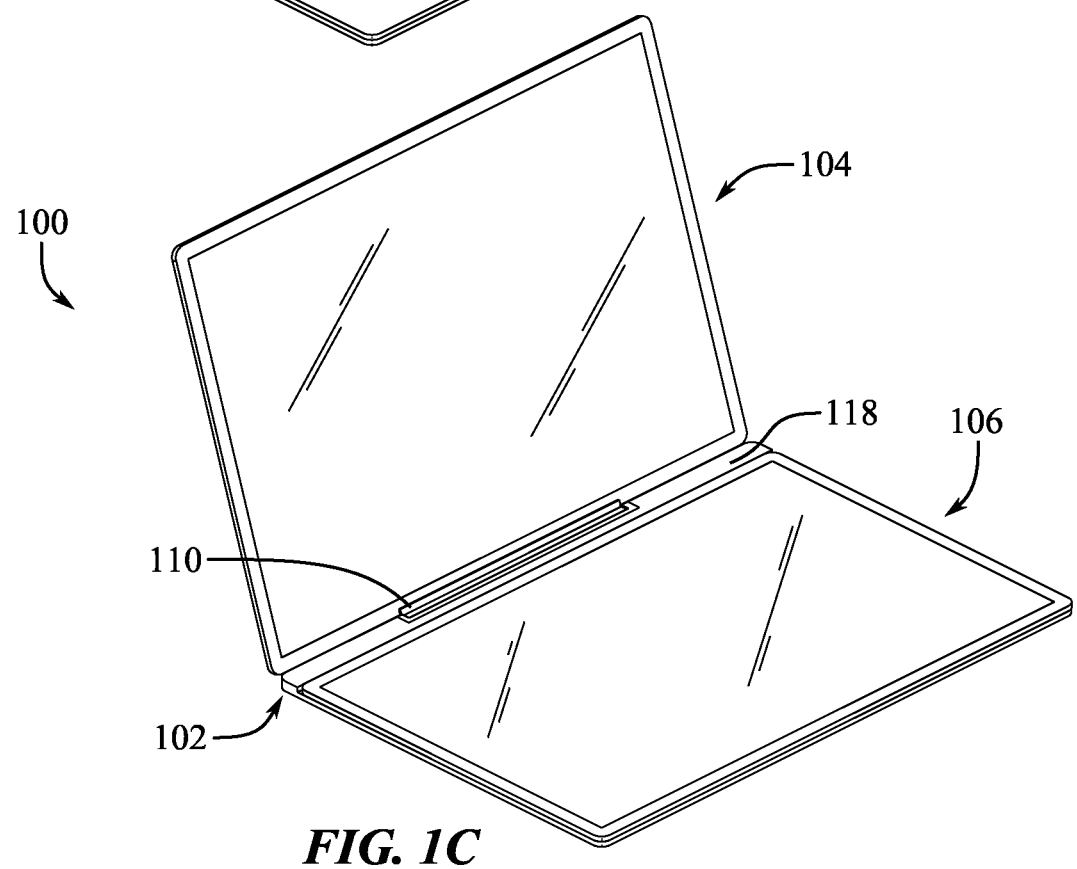
FIG. 1C shows a perspective view of the computing device of FIG. 1A arranged in another configuration.

FIG. 1C illustrates a perspective view of the computing device 100 arranged in a second configuration, wherein the first display 104 is removably attached to the hinge 110 and the second display 106 is positioned adjacent the input surface 114. Again, while coupled or affixed to the base 102, the first display 104 can be placed in electrical and/or wireless communication with one or more computing components within the base 102, other components within the base 102 (e.g., a power source), the second display 106, an ancillary device (e.g., the keyboard 108), or a combination thereof. For example, the retaining portion 112 can form an electrically conductive pathway configured to receive data and/or power from the first display 104 and distribute the data to one or more of the components described above. Likewise, the retaining portion 112 can be configured to transfer or deliver data and/or power to the first display 104 from one or more of the components described above.

Like the first display 104, while coupled or affixed to the input surface 114, the second display 106 can also be placed in electrical communication with one or more computing components within the base 102, other components within the base 102 (e.g., a power source), the first display 104, an ancillary device (e.g., the keyboard 108), or a combination thereof. For example, the second display 106 can wirelessly transfer data and/or power to the base 102 or other component as a result of user input received at the second display 106 (e.g., user input at a surface of the second display 106 configured to receive capacitive touch input). The second display 106 can be aligned and affixed to the base 102, for example, using one or more magnets within the base 102 and/or the second display 106. In some examples, the raised portion 118 of the base 102 can act as a datum for aligning the second display 106 relative to the input surface 114. Additionally, or alternatively, a bottom surface (e.g., a surface of the second display 106 which interfaces with the base 102) can have a relatively high coefficient of friction to limit or prevent the second display 106 from sliding or moving on the base 102.

Figure 2A:
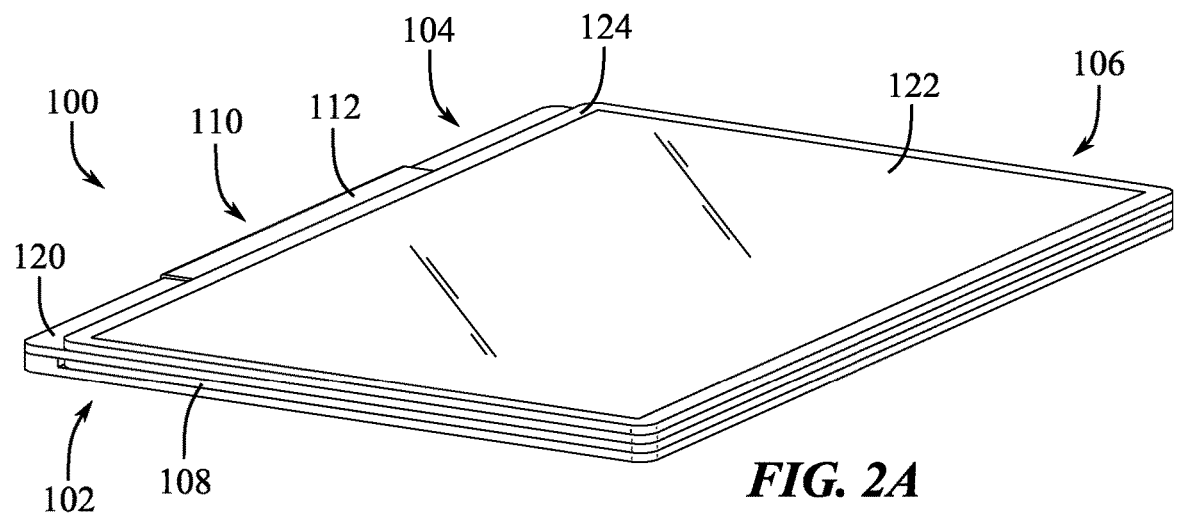
FIG. 2A shows a perspective view of the computing device of FIG. 1A arranged in another configuration and in a closed state.

FIG. 2A shows the computing device 100 of FIG. 1A in a closed state arranged in a third configuration, wherein the second display 106 is positioned on a housing 120 of the first display 104 such that a display screen 122 of the second display 106 is visible or otherwise accessible to a user of the computing device 100. As illustrated in FIG. 2A, the keyboard 108 can be positioned between the base 102 and the first display 104 while the computing device 100 is in a closed state. In some examples, while the computing device 100 is in a closed state and the keyboard 108 is positioned between the base 102 and the first display 104, the first display 104 and/or the keyboard 108 can be deactivated or non-functioning to prevent unintentional or accidental input to the computing device 100 from the first display 104 and the keyboard 108. If the computing device 100 is opened by a user to an opened state, the second display 106 can be deactivated or rendered inoperable while the first display 104 and/or keyboard 108 can be activated or rendered operable.

In this configuration, the second display 106 can function as the primary display for the computing device 100 and receive user input at the display screen 122. In some examples, the computing device 100 can function as a tablet computing device in this configuration, wherein the user interacts and interfaces with the second display 106. The second display 106 can be removably affixed to the first display 104, for example, by one or more magnets positioned within the first display 104 and/or the second display 106. In some examples, the housing 120 of the first display can include metal or a magnet that interacts with one or more magnets within the second display 106 to removably couple the second display 106 to the housing 120 of the first display 104. Similarly, a housing 124 of the second display 106 can include metal or magnets that interact with one or more magnets within the first display 104 to removably couple the second display 106 to the first display 104.

Figure 2B:
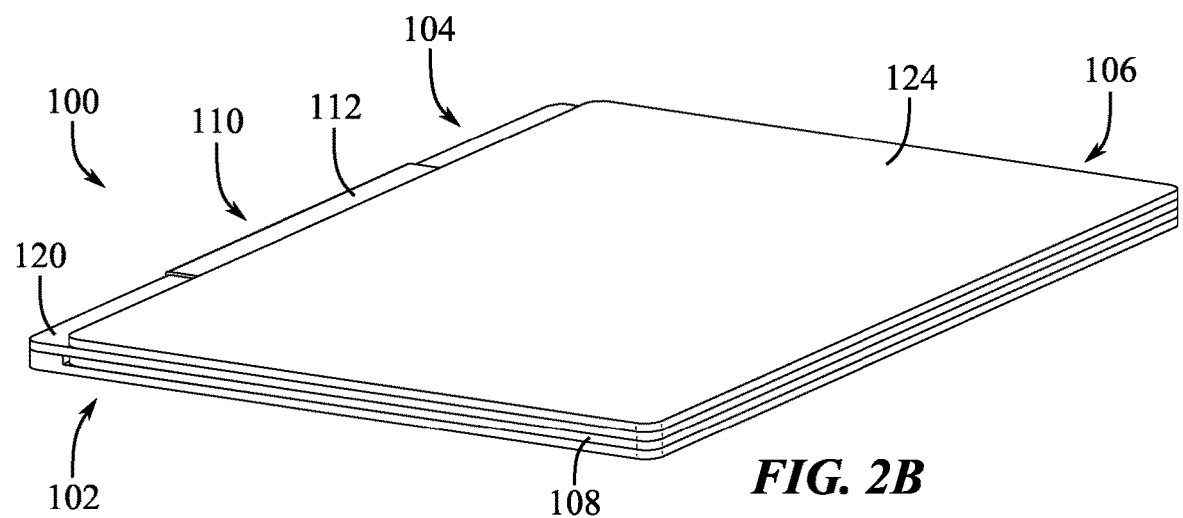
FIG. 2B shows a perspective view of the computing device of FIG. 1A arranged in another configuration and in a closed state.

FIG. 2B shows the computing device 100 of FIG. 1A in a closed state arranged in a fourth configuration, wherein the second display 106 is positioned on the housing 120 of the first display 104 such that the display screen 122 of the second display 106 is nonvisible or otherwise facing downward and toward the first display 104. Like the configuration illustrated in FIG. 2A, the keyboard 108 can be positioned between the base 102 and the first display 104 while the computing device 100 is in a closed state. Again, while the computing device 100 is in a closed state and the keyboard 108 is positioned between the base 102 and the first display 104, the first display 104 and/or the keyboard 108 can be deactivated or non-functioning to prevent unintentional or accidental input to the computing device 100 from the first display 104 and the keyboard 108.

If the computing device 100 is opened by a user to an open state, the first display 104 and/or keyboard 108 can be activated or rendered operable. In this configuration, the second display 106 can be inoperable or deactivated to no longer output content to a user or receive input from a user. This can be beneficial, for example, when transporting the computing device 100 and input at the computing device 100 is undesirable. Like the configuration shown in FIG. 2A, the second display 106 can be removably affixed to the first display 104 in this configuration. For example, the second display 106 can be removably affixed to the first display 104 by one or more magnets positioned within the first display 104 and/or the second display 106.

Figure 2C:
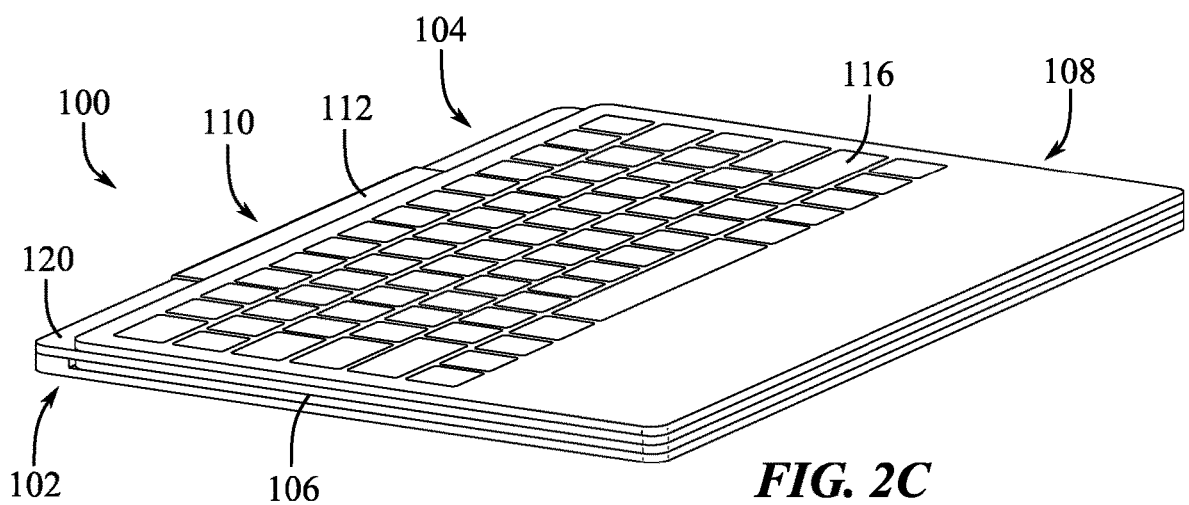
FIG. 2C shows a perspective view of the computing device of FIG. 1A arranged in another configuration.

FIG. 2C shows the computing device 100 of FIG. 1A in a closed state arranged in a fifth configuration, wherein the keyboard 108 is positioned on the housing 120 of the first display 104. As illustrated in FIG. 2C, the second display 106 can be positioned between the base 102 and the first display 104 while the computing device 100 is in a closed state. While the computing device 100 is in a closed state and the second display 106 is positioned between the base 102 and the first display 104, the first display 104 and/or the second display 106 can be deactivated or non-functioning to prevent unintentional or accidental input to the computing device 100 from the first and second displays 104, 106. By positioning the second display 106 between the base 102 and the first display 104, the second display 106 can be protected or shielded from potential damage when transporting the computing device 100. Moreover, the first display 104 can be protected or shielded from damage by the keyboard 108.

If the computing device 100 is opened by a user to an open state, the first display 104 and/or the second display 106 can be activated or rendered operable. The keyboard 108 can be removably affixed to the first display 104, for example, by one or more magnets positioned within the first display 104 and/or the keyboard 108. In some examples, the housing 120 of the first display can include metal that interacts with one or more magnets within the keyboard 108 to removably couple the keyboard 108 to the housing 120 of the first display 104.

In some examples, the component positioned on the first display 104 (e.g., the second display in FIGS. 2A and 2B, or the keyboard 108 in FIG. 2C) can remain affixed to the first display 104 while the computing device 100 is opened by a user, and can remain affixed while the computing device 100 is left in an open state. Although reference has been made to the first and second displays 104, 106 in particular positions within the computing device 100, the first display 104 can be substituted for the second display 106, and vice versa. For example, the relative positions and functions of the first and second displays of FIG. 2A can be swapped such that the first display 104 is positioned outside of the closed computing device 100.

Figure 3A:
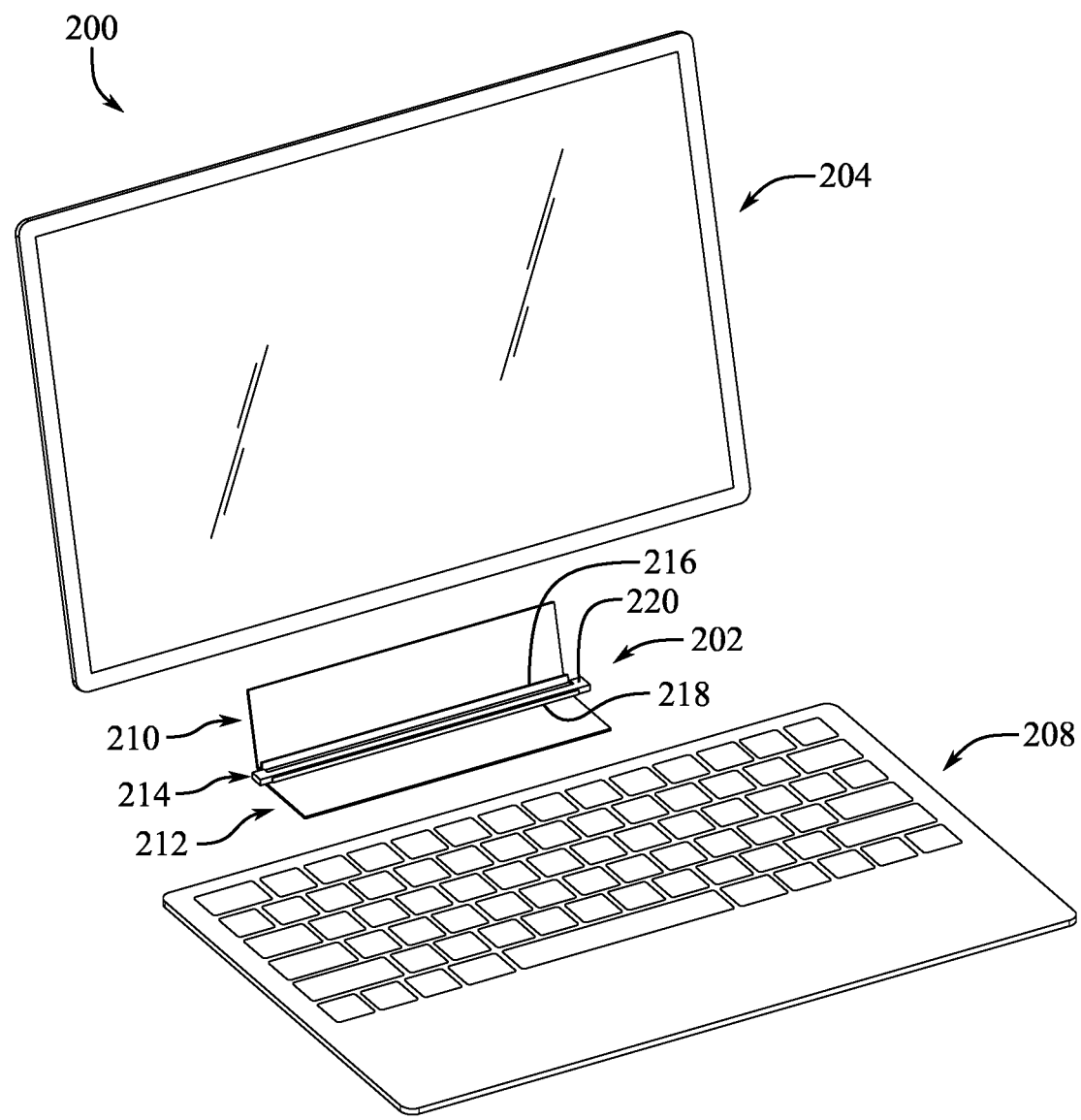
FIG. 3A shows a perspective view of a computing device.

Various examples of computing devices having one or more electronic devices attached thereto are described below with reference to FIGS. 3A-4C. FIG. 3A shows an example of a computing device 200 as discussed herein, including a coupling mechanism 202, a first display 204, a second display 206 (see FIG. 3C), and a keyboard 208. One or more of the first display 204, the second display 206, and the keyboard 208 can be combined in various configurations with the coupling mechanism 202 to form the computing device 200. In some examples, the computing device 200 and the first display 204, the second display 206, and the keyboard 208 can include some or all of the features of the other computing devices, displays, and keyboards discussed herein.

The coupling mechanism 202 can include first and second retaining portions 210, 212 pivotably coupled to an intermediate portion 214 such that displays or keyboards coupled to the first or second retaining portion 210, 212 can pivot relative to the intermediate portion 214. Each of the first and second retaining portions 210, 212 can be configured to removably retain an electronic device (e.g., the first or second displays 204, 206, or the keyboard 208) or other objects to the coupling mechanism 202. In some examples, the first retaining portion 210 can define or form a first channel 216, and the second retaining portion 212 can define or form a second channel 218. Either the first display 204, the second display 206, the keyboard 208, or another object can be removably retained within one of the first or second channels 216, 218 or otherwise removably attached to the coupling mechanism 202. For example, the first retaining portion 210 can be magnetic or can include one or more magnets or electromagnets which retain a portion of the housing of the electronic device to the first retaining portion 210.

In some examples, the intermediate portion 214 can form an elongate member 220 having first and second recesses, formed therein. In some examples, the elongate member 220 can form an internal volume. One or more computing components, sensors, other components, or a combination thereof can be disposed within the internal volume of the elongate member 220. The first recess can receive at least a portion of the first pivot member while the second recess can receive at least a portion of a second pivot member. The coupling mechanism 202 will be discussed in further detail herein with reference to FIGS. 8A through 8D.

Figure 3B:
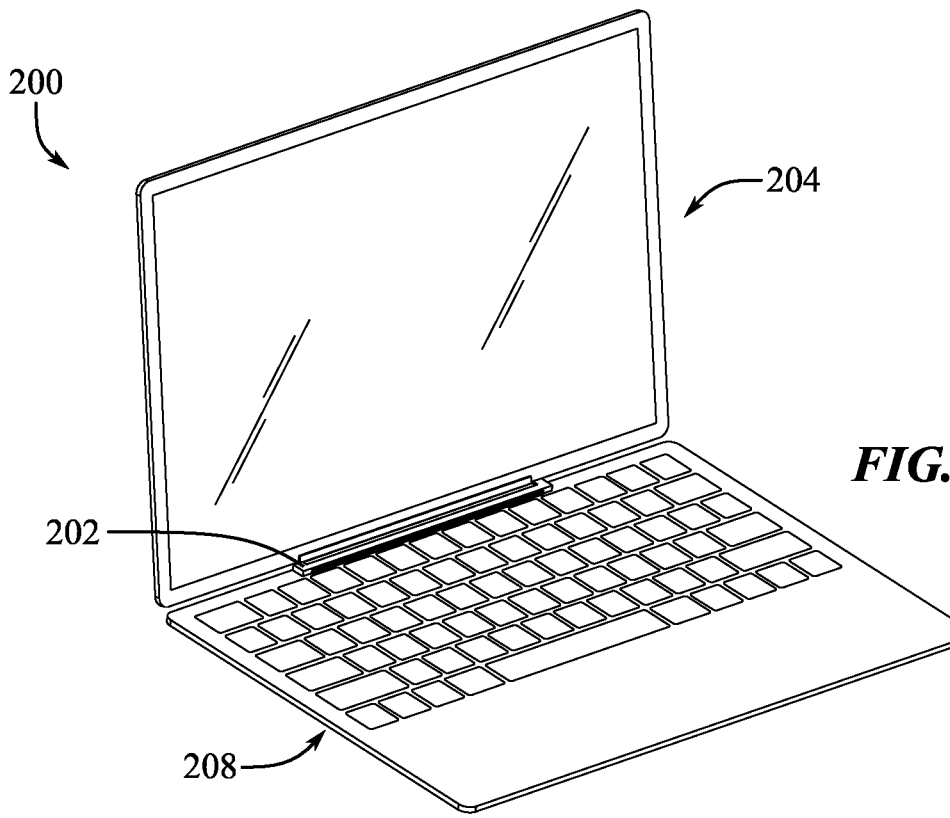
FIG. 3B shows a perspective view of the computing device of FIG. 3A arranged in an assembled configuration.

FIG. 3B illustrates a perspective view of the computing device 200 arranged in a first configuration, wherein the first display 204 is removably coupled to the first retaining portion 210 and the keyboard 208 is removably coupled to the second retaining portion 212. In this configuration, the computing device 200 can substantially resemble and/or function as a traditional laptop computing device.

While coupled or affixed to the coupling mechanism 202, the first display 204 can be placed in wireless and/or electrical communication with one or more computing components within the coupling mechanism 202 (e.g., a processor, memory, etc.), other components within the coupling mechanism 202 (e.g., a power source), the keyboard 208, or a combination thereof. For example, the first retaining portion 210 can form an electrically conductive pathway configured to receive data and/or power from the first display 204 and distribute the data and/or power to one or more of the components described above. Likewise, the first retaining portion 210 can be configured to transfer or deliver data and/or power to the first display 204 from one or more of the components described above. As such, the first and second retaining portions 210, 212 and the intermediate portion 214 can form a wireless and/or conductive pathway to electrically couple the first display 204 to the keyboard 208.

Figure 3C:
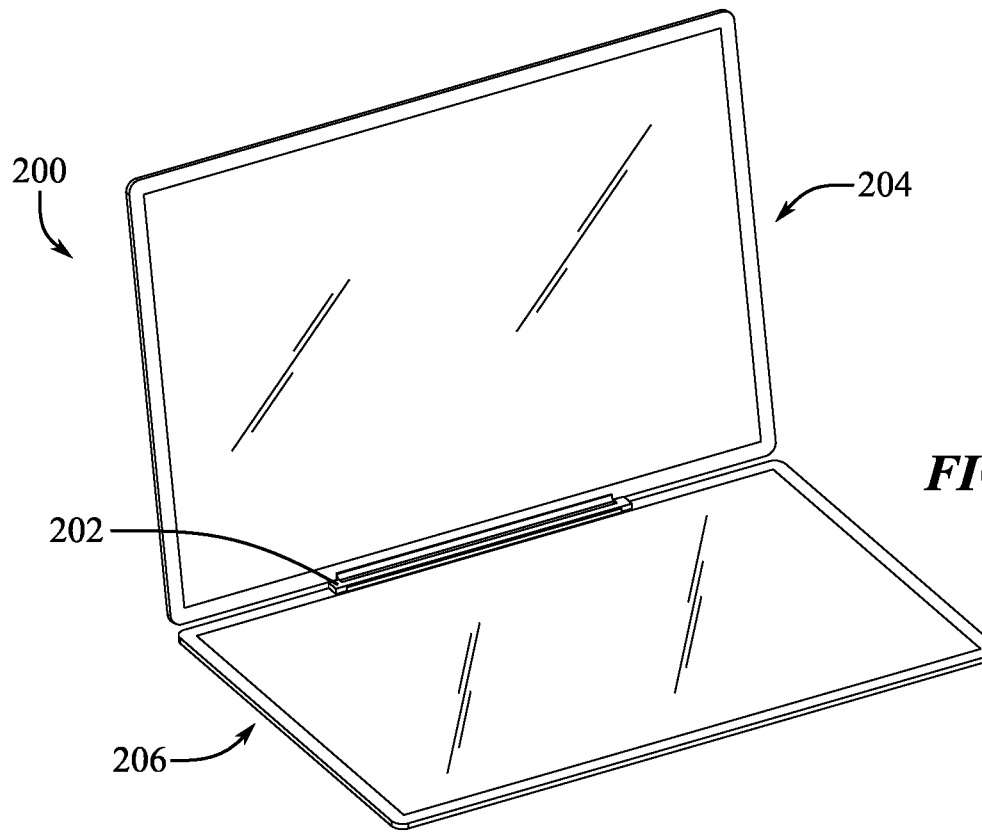
FIG. 3C shows a perspective view of the computing device of FIG. 3A arranged in another assembled configuration.

FIG. 3C illustrates a perspective view of the computing device 200 arranged in a second configuration, wherein the first display 204 is removably coupled to the first retaining portion 210, and the second display 206 is removably coupled to the second retaining portion 212. In this configuration, the second display 206 can function as a virtual keyboard, a track pad, a secondary display, another form of input component, or a combination thereof.

While coupled or affixed to the coupling mechanism 202, the second display 206 can be placed in electrical and/or wireless communication with one or more computing components within the coupling mechanism 202 (e.g., a processor, memory, etc.), other components within the coupling mechanism 202 (e.g., a power source), the first display 204, or a combination thereof. For example, the second retaining portion 212 can form an electrically conductive pathway configured to receive data and/or power from the second display 204 and distribute the data and/or power to one or more of the components described above. Likewise, the second retaining portion 212 can be configured to transfer or deliver data and/or power to the second display 206 from one or more of the components described above. As such, the first and second retaining portions 210, 212 and the intermediate portion 214 can form a conductive pathway to electrically couple the first display 204 to the second display 206.

Figure 4A:
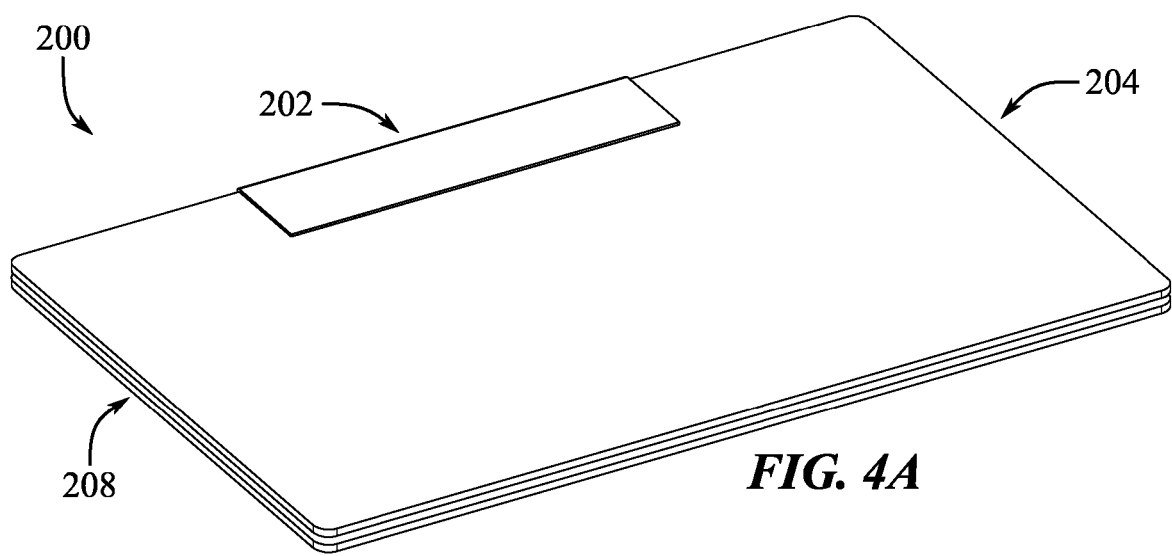
FIG. 4A shows a perspective view of the configuration of FIG. 3B in a closed state.

FIG. 4A shows the configuration of the computing device 200 of FIG. 3B in a closed state having the first and second retaining portions 210, 212 rotated relative to the intermediate portion 214 such that the first display 204 is positioned adjacent the keyboard 208. While in the closed state, the first display 204 and the keyboard 208 can be inoperable or deactivated to prevent accidental or unwanted operation of the computing device 200.

In some examples, the first and second retaining portions 210, 212 can be pivotally coupled to the intermediate portion 214 such that the first display 204 and keyboard 208 are substantially parallel to one another while the computing device 200 is in a closed state. The computing device 200 can be biased to remain in a closed state while the first display 204 and the keyboard 208 are substantially parallel. For example, the coupling mechanism 202 can include a biasing member (e.g., a spring, not shown) configured to bias the first retaining portion 210 in a particular position relative to the second retaining portion 212. Alternatively or additionally, one or more magnets can be positioned within the first display 204 and keyboard 208 such that the magnets bias the keyboard 208 to contact the first display 204 while they are in proximity to one another (i.e., when the computing device 200 is in the closed state).

Figure 4B:
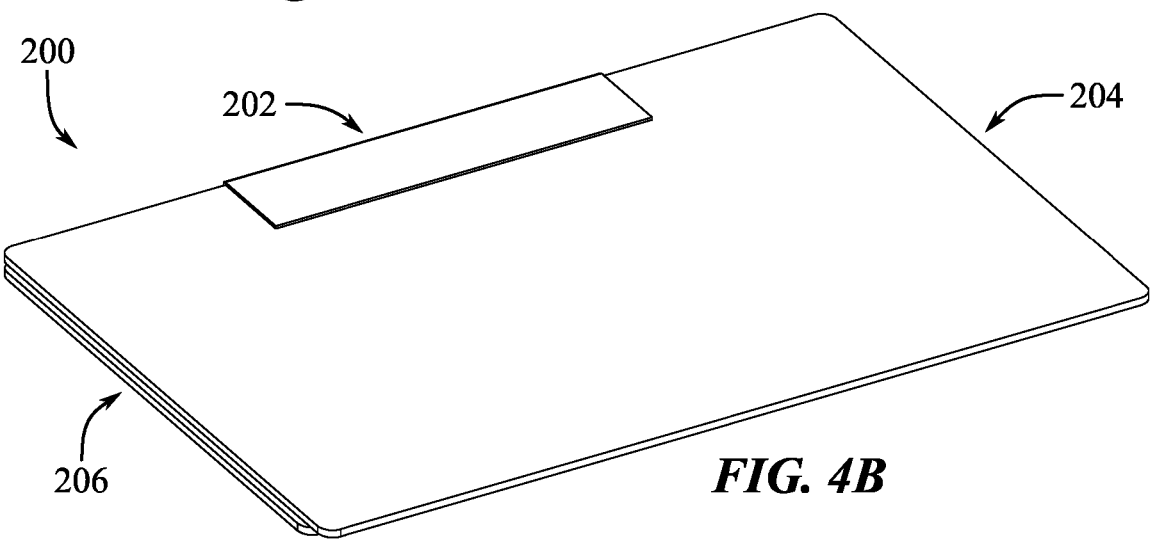
FIG. 4B shows a perspective view of the configuration of FIG. 3C in a closed state.

FIG. 4B shows the configuration of the computing device 200 of FIG. 3C in a closed state having the first and second retaining portions 210, 212 rotated relative to the intermediate portion 214 such that the first display 204 is positioned adjacent the second display 206. While in the closed state, the first display 204 and the second display 206 can be inoperable or deactivated to prevent accidental or unwanted operation of the computing device 200.

In some examples, the first and second retaining portions 210, 212 can be pivotally coupled to the intermediate portion 214 such that the first display 204 and the second display 206 are substantially parallel to one another while the computing device 200 is in a closed state. The computing device 200 can be biased to remain in a closed state while the first display 204 and the second display are substantially parallel. For example, the coupling mechanism 202 can include a biasing member (e.g., a spring) configured to bias the first retaining portion 210 in a particular position relative to the second retaining portion 212. Alternatively or additionally, one or more magnets can be positioned within the first display 204 and the second display 206 such that the magnets bias the second display 206 to contact the first display 204 while they are in proximity to one another (i.e., when the computing device 200 is in the closed state).

Figure 4C:
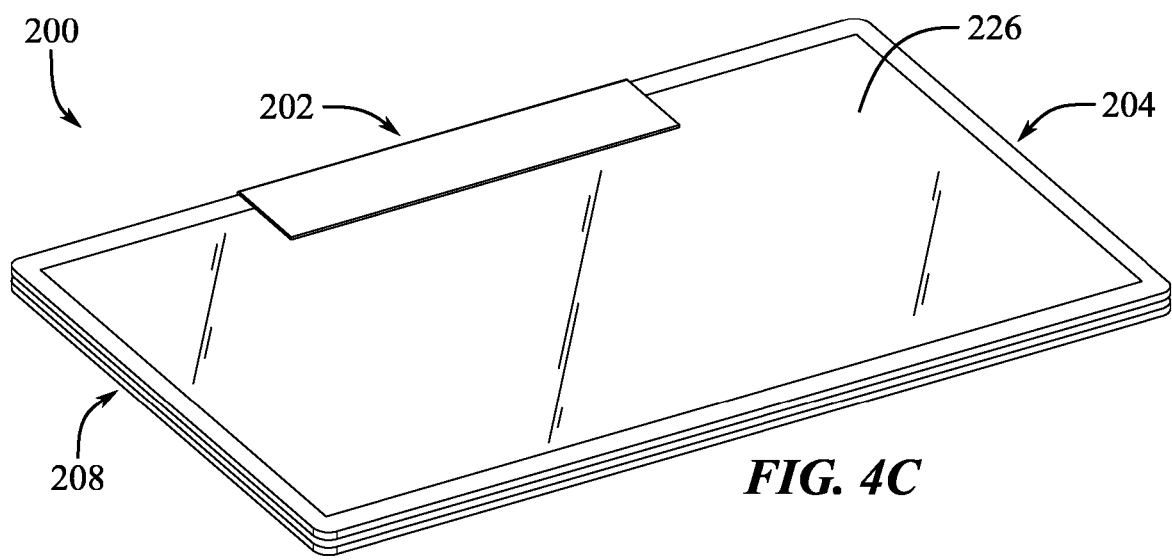
FIG. 4C shows a perspective view of the computing device of FIG. 3A arranged in another configuration.

FIG. 4C shows the computing device of FIG. 4A in a closed state and in another configuration, wherein the first display 204 is positioned within the first retaining portion 210 such that a display screen 226 of the first display 204 is oriented away from the keyboard 208. In some examples, the computing device 200 can function as a tablet computing device in this configuration, wherein the user interacts and interfaces with the first display 204.

As illustrated by FIGS. 4A and 4C, the first display 204 can be received and retained within the first retaining portion 210 in multiple orientations. For example, as shown in FIG. 4A, the first display 204 can be oriented within the first retaining portion 210 such that the display screen 226 is oriented toward the keyboard 208. However, the first display 204 can be detached or removed from the first retaining portion 210, flipped or rotated, and reattached within the first retaining portion 210 such that the display screen 226 is oriented away from the keyboard 208, as shown in FIG. 4C. Thus, the computing device 200 is modular or otherwise configured to permit removal and reattachment of a plurality of components (e.g., the first display 204, the second display 206, the keyboard 208, other objects, or combinations thereof) in various orientations relative to the first and second retaining portions 210, 212.

Various examples of computing devices having a base configured to couple to one or more electronic devices are described below with reference to FIGS. 5A-7B. FIG. 5A-5C illustrate various views of an example of a computing device 300 including a base 302 and a display 304. In some examples, the computing device 300 can be substantially similar to any of the computing devices described herein, such as the computing device 100 depicted in FIGS. 1A-2C. For example, the computing device 300 can include a second display and keyboard (not shown) configured to removably couple to the base 302. Moreover, the display 304 can be removable from a hinge 306 of the base 302.

Like other examples described herein, the base 302 can define an input surface 308 that receives input from a user of the computing device 300. In some examples, the input surface 308 can detect touch input at one or more locations on the input surface 308 that correspond to a particular response by the computing device 300. For example, a keyboard can be projected, etched, or otherwise defined on the input surface 308, and the user input (e.g., touch input or gesture input) at a location on the input surface 308 can cause the computing device 300 to display an indicia, such as, a letter, symbol, or other alphanumeric value which corresponds with the location, or to perform any other desired action.

Additionally or alternatively, at least a portion of the input surface 308 can be configured to operate as a track pad and thereby control or operate a cursor displayed at the display 304. As such, the input surface 308 can detect a touch, near touch, and/or force input to determine a direction in which a cursor or other indicator, displayed at the display 304, can move (e.g., in response to a user input signal associated with the cursor movement). Thus, multiple discrete touch and/or force inputs can be compared across the input surface 308 to determine a direction of motion of a user's finger across the input surface 308. A user input signal can be generated that instructs the computing device 300 to display the cursor in a new position based on the determined direction of motion, or to perform any other desired action. The portion of the input surface 308 that operates as a track pad can vary, for example, on a program or software being run on the computing device 300. In some examples, the input surface 308 can function as a track pad and keyboard simultaneously, for example, by detecting touch input at a location as an input of the keyboard and detecting a sliding touch input as an input of the track pad.

The base 302 can form or define a raised portion 310 having one or more sensors, computing components, or combinations thereof. In some examples, the raised portion 310 can include a top wall 312 and a side wall 314. The side wall 314 can be substantially perpendicular to the top wall 312. In some examples, the side wall 314 can define a datum or alignment surface at which other devices (e.g., a second display, keyboard, etc.) can be positioned to align the other devices on the input surface 308. Like the input surface 308, the top wall 312 of the raised portion 310 can be configured to receive input from a user. For example, the top wall 312 can operate as a dynamic input/output device or other input mechanism. Non-limiting examples of dynamic input/output devices are described U.S. Pat. No. 9,927,895 issued Mar. 27, 2018, the disclosure of which is hereby incorporated by reference in its entirety.

The base 302 can include any material that permits the functionality and uses described herein. In some examples, the base 302 can include a metal, a metal alloy, a glass, a ceramic, a polymer, or combinations thereof. For example, the base 302 can include aluminum and glass, wherein the glass forms the input surface 308 and the aluminum forms the rest of the structure of the base 302. Forming the input surface 308 of glass, polymer, or ceramic can permit radio frequency (RF) transmission and reception through the input surface 308. For example, a transceiver or antenna positioned within the base 302 can receive and send RF signals through the input surface 308. In some examples, a relatively small portion of the base 302 can be made of an RF transparent material, such as, the raised portion 310 to provide wireless communication to other devices (e.g., IEEE 802: Bluetooth and Wi-Fi wireless networking technologies).

In some examples, the input surface 308 can be a smooth planar surface devoid of ridges, recesses, or formations on the input surface 308. For example, the input surface 308 can a smooth surface on which input regions are projected or otherwise displayed as a reference for the user of the computing device 300. For example, a projector can be positioned in the raised portion 310 and configured to project an image on the input surface 308 or elsewhere. In other examples, the input surface 308 can be a textured planar surface having ridges, recesses, and/or other formations thereon. For examples, the input surface 308 can be etched or machined to define key boundaries of a QWERTY keyboard discernable by a user of the computing device 300.

Figure 6:
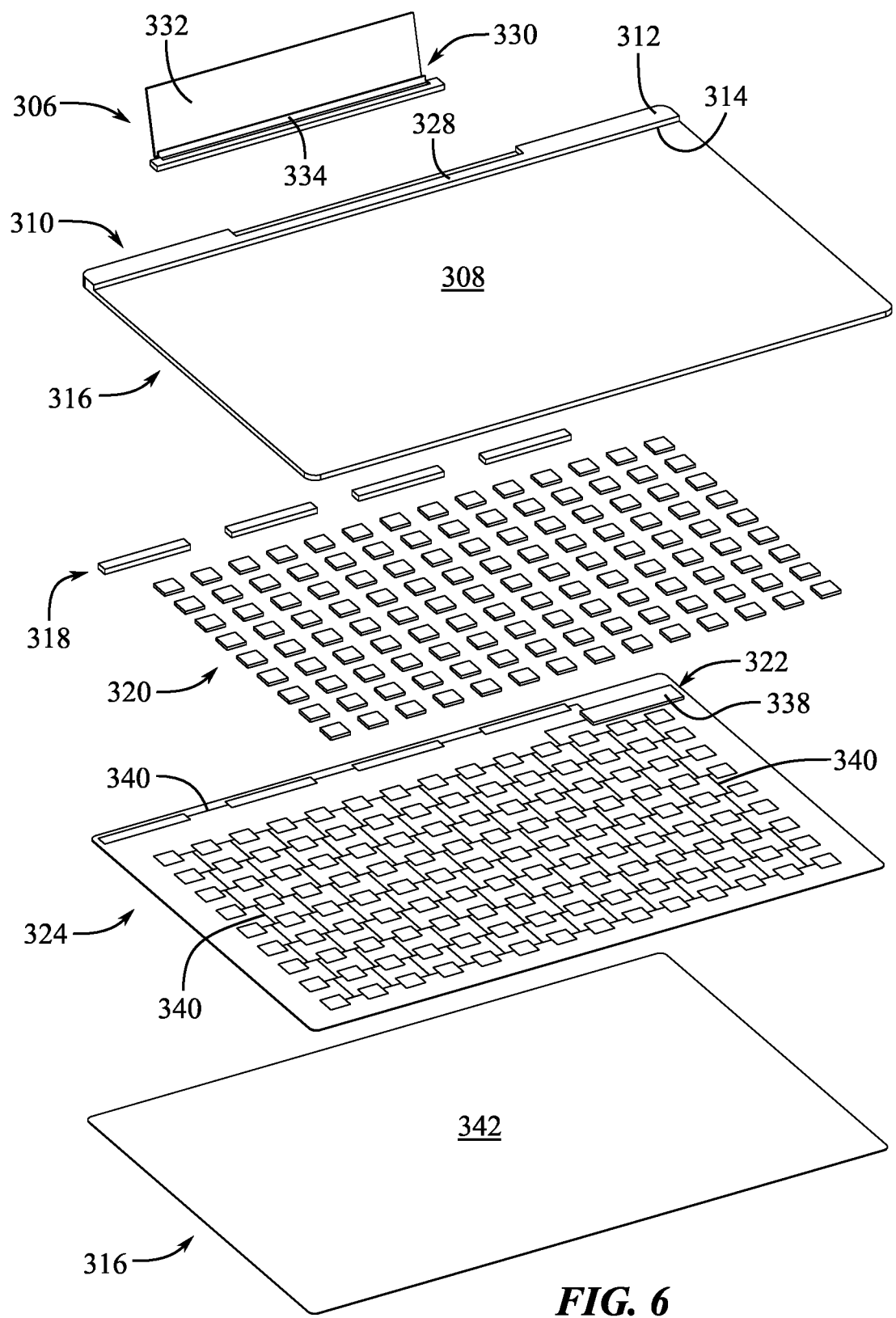
FIG. 6 shows an exploded view of the computing device FIG. 5A.

FIG. 6 shows an exploded view of the base 302 including the hinge 306, an upper portion 316 of the base 302, a plurality of sensors 318, 320, computing components 322, a substrate 324, and a lower portion 326 of the base 302. As illustrated in FIG. 6, the base 302 can form a body around which other components can be positioned. For example, the base 302 can define an internal volume or cavity between the upper portion 316 and the lower portion 326. One or more of the plurality of sensors 318, 320, the computing components 322, the substrate 324, or a combination thereof can be disposed within the internal volume (see internal volume 344 in FIGS. 7A and 7B).

The hinge 306 can be pivotally coupled to the base 302, for example, a portion of the hinge 306 can pivotally couple within a recess 328 formed within the base 302. For example, a pivot member (see FIGS. 7A and 7B) of the hinge 306 can be positioned within the recess 328. The hinge 306 can pivotally or rotatably couple to the base 302 by any mechanism now known in the art or as may be developed in the future. For example, the hinge 306 can be pinned to the base 302 to enable the hinge 306 to rotate relative to the base 302.

Figure 7A:
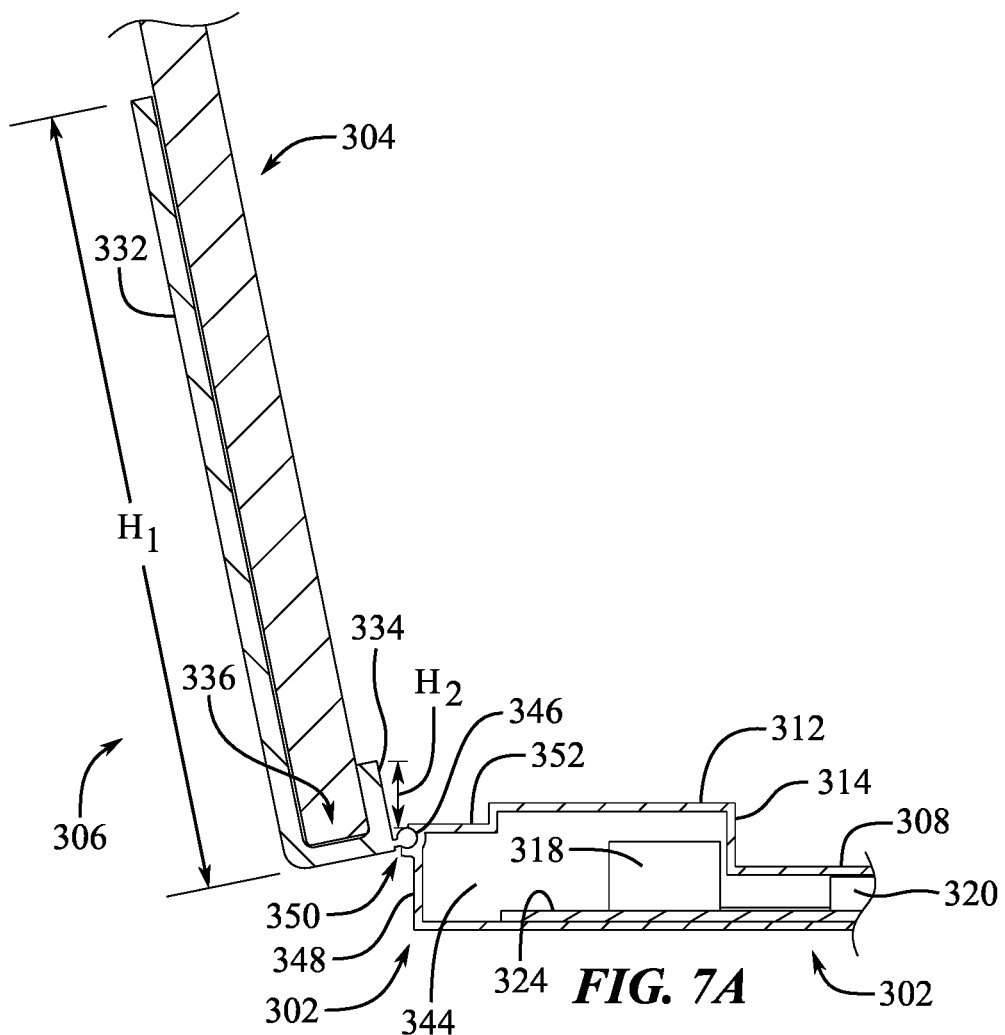
FIGS. 7A and 7B show sectional views of the computing device of FIG. 5B in an open and a closed state.
Figure 7B:
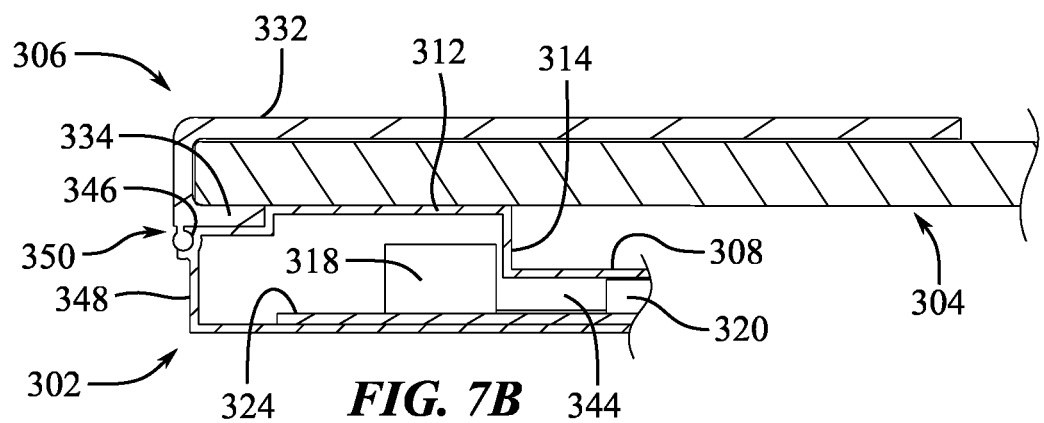

The retaining portion 330 can include a first wall 332 and a second wall 334 that define a channel 336 (see FIGS. 7A and 7B). A device, such as a display, can be at least partially positioned between the first and second walls 332, 334 and within the channel 336 when the device is removably affixed within the retaining portion 330. In some examples, the first wall 332 can have a first height $H_1$ while the second wall 334 has a second height $H_2$ (see FIGS. 7A and 7B). The first height $H_1$ can be different from the second height $H_2$. For example, the first height $H_1$ can be greater or taller than the second height $H_2$ in some examples. Although the first height $H_1$ is depicted as greater or taller that the second height $H_2$ in FIGS. 7A and 7B, in other examples, the second height $H_2$ can be equivalent to the first height $H_1$ or less than the first height $H_1$.

In some examples, the input surface 308 can define the entirety of the upper portion 316 of the base 302. In other examples, the input surface 308 can define a portion of the upper portion 316. The first plurality of sensors 318 can be disposed within the internal volume 344 and below the raised portion 310 to detect touch input at the base 302. For example, the first plurality of sensors 318 can detect touch input at the raised portion 310. Additionally, or alternatively, the first plurality of sensors 318 can detect a location at which the input surface 308 receives input. For example, the first plurality of sensors 318 can be configured to emit light or another form of energy that rebounds or reflects from the user's finger or hand to determine a distance from the sensor 318 that the user touches the input surface 308. The sensor 318 (or a processing unit 338 communicatively coupled to the sensor 318) can then determine the location at which the input surface 308 was touched based on the determined distance and implement a response to the input.

The second plurality of sensors 320 can be disposed within the internal volume 344 and below the input surface 308. The second plurality of sensors 320 can be configured to detect touch input or near touch input at the input surface 308. For example, the plurality of sensors 320 can be an array of electrodes configured to detect a change in capacitance at the input surface 308. Additionally, or alternatively, the second plurality of sensors 320 can include piezoelectric or strain-sensing elements configured to detect a force at the input surface 308. After input at the input surface 308 is detected by the second plurality of sensors 320, a signal corresponding to the user input can be generated and transmitted to another component within the base 302, such as, the processing unit 338.

The first and second plurality of sensors 318, 320, the processing unit 338, other computing components (e.g., a memory), or a combination thereof can be communicatively coupled to the substrate 324. In some examples, the substrate 324 includes electrical traces 340 electrically coupling each of the first and second plurality of sensors 318, 320, the processing unit 338, and other computing components (e.g., a memory). The substrate 324 can include a printed circuit board (PCB) having one or more electrical components (e.g., capacitors, resistors, inductors, transistors, etc.) and logic circuitry that enable the functionality of the base 302, as well as one or more wireless antennas as described herein.

The computing device 300 can use the electrical response of the sensor(s) 318, 320 to control a function of the computing device 300 and to provide haptic feedback (e.g., a tactile vibration) to the input surface 308. In some examples, one or more haptic elements can provide localized haptic feedback to the input surface 308, for example, at or near the location of the received touch and/or force input. Additionally or alternatively, haptic feedback can be provided to the input surface 308 to indicate to a user a boundary of sub-input regions (e.g., causing a tactile vibration when a user's finger traverses a perimeter of a virtual key). This can simulate a keyboard surface having discrete keys (e.g., as a keyboard having mechanically actuated key caps), but over a substantially flat dimensionally variable input surface 308. The components involved in producing a haptic response can include an input surface and one or more actuators (such as piezoelectric transducers, electromechanical devices, and/or other vibration inducing devices). In some examples, the input surface 308 can be defined by any variety of input device including, but in no way limited to capacitive touch inputs, mechanical inputs, or optically sensed inputs.

The processing unit 338 can include one or more computer processors or microcontrollers that perform operations in response to receiving computer-readable instructions. The processing unit 338 can include a central processing unit (CPU) of the computing device 300 and a memory. Additionally, or alternatively, the processing unit 136 can include other processors within the computing device 300 including application specific integrated chips (ASIC) and other microcontrollers.

The memory can include a variety of types of non-transitory computer-readable storage media, including, for example, read access memory (RAM), read-only memory (ROM), erasable programmable memory (e.g., EPROM and EEPROM), or flash memory. The memory can store the computer-readable instructions. Additionally, or alternatively, the memory can include a variety of types of non-transitory computer-readable storage media including, for example, a hard-drive storage device, a solid state storage device, a portable magnetic storage device, or other similar device. The processing unit 338 can read computer-readable instructions stored on the memory. The computer-readable instructions can cause the processing unit 338 to perform the operations, functions, and aspects of the disclosure described herein. The computer-readable instructions can be provided as a computer-program product, software application, or the like.

In some examples, the computing device 300 can also include one or more power supplies or power sources (not shown) positioned within the base 302 and operably coupled to the computing components (e.g., the processing unit 338, and/or other computing components). For example, the computing device 300 can include one or more power supplies positioned within internal volume defined by the base 302. The one or more power supplies can be rechargeable and provide electrical power to the computing components and sensors 318, 320 of the computing device 300. The one or more power supplies can include any device capable of storing and discharging electricity, such as one or more lithium-ion polymer batteries or other forms of electrical power storage.

In some examples, the power supply of the computing device 300 can include one or more inductive charging coils. The inductive charging coil can enable the power supply of the computing device 300 to charge using resonant inductive coupling, for example, while the computing device 300 is positioned over or adjacent a charging pad. In some examples, the inductive charging coil can provide between 5 and 15 watts of electrical power to the power supply of the computing device 300. The inductive charging coil can be configured to operate in accordance with a known charging technology, such as, the Qi open interface standard for wireless power transfer or other mechanism for wirelessly charging an electronic device.

The lower portion 326 of the base 302 forms a bottom surface 342 supporting the substrate 324 and the plurality of sensors 318, 320. The lower portion 326 can affix to the upper portion 316 by fasteners, clips, interlocking features, adhesives, or another mechanism for coupling the lower portion 326 to the upper portion 316. In some examples, a barrier, gasket, or membrane (not shown) can be affixed between the lower portion 326 and the upper portion 316 to inhibit or otherwise prevent ingress of contaminants (e.g., liquid, dust particles, debris) into the internal volume of the base 302.

FIGS. 7A and 7B show sectional views of the computing device 300 in an opened state (FIG. 7A) and the computing device 300 in a closed state (FIG. 7B). In some examples, the display 304 can be retained within the channel 336 defined by the first and second walls 332, 334 of the retaining portion 330. The retaining portion 330 can rotate relative to the base 302. As such, the display 304, which is removably coupled to the retaining portion 330, can be rotated relative to the base 302. As illustrated in FIGS. 7A and 7B, the plurality of sensors 318, 320 and the substrate 324 can be disposed within the internal volume 344 defined by the base 302.

The raised portion 310 of the base 302 can define a recess 346. In some examples, the recess 346 can be formed within respective rear surface 348 of the base 302, as shown in FIGS. 7A and 7B. The retaining portion 330 can include a pivot member 350 configured to be positioned within the recess 346 and permit the retaining portion 330 to rotate relative to the base 302. In other words, the pivot member 350 can couple or interlock with the recess 346 such that the pivot member 350 can rotate within the recess 346. For example, the pivot member 350 can define a rotational axis about which the retaining portions 330 can rotate, pivot, or otherwise move. While the example depicted in FIGS. 7A and 7B illustrate the base 302 having a recess 346 within the rear surface 348, the base 302 can, in other examples, include recesses in the top wall 312 of the raised portion 310 or other surfaces of the base 302.

The raised portion 310 can form or define a cavity 352 configured to receive at least a portion of the second wall 334 of the retaining portion 330 when the computing device 300 is in a closed state. For example, the cavity 352 can have dimensions substantially similar to the dimensions of the second wall 334 to enable the second wall 334 to move within the cavity 352 when the retaining portion 330 is rotated into a closed state (as shown in FIG. 7B).

Various examples of computing devices having one or more electronic devices attached thereto are described below with reference to FIGS. 8A-9. FIGS. 8A-8C show multiple views of an example of a coupling mechanism 400 including a first retaining portion 402 and a second retaining portion 404, each of the first and second retaining portions 402, 404 can be independently rotatable or pivotable relative to an intermediate portion 418. In some examples, the coupling mechanism 400 can be substantially similar to, and include some or all of the features of coupling mechanisms described herein, such as coupling mechanism 202 depicted in FIGS. 3A-4C. For example, one or more displays and/or keyboards (not shown) can be operably coupled to the first and second retaining portions 402, 404 of the coupling mechanism 400 to form a computing device. Likewise, each of the first and second retaining portions 402, 404 can be substantially similar to the first and second retaining portions 210, 212 depicted in FIGS. 3A-4C. FIG. 8D shows a sectional view of the coupling mechanism 400 taken through the lines 8D of shown in FIG. 8C.

The first retaining portion 402 can include first and second walls 406, 408 that form a channel 410 extending between the first and second walls 406, 408. The channel 410 can receive a portion of a device, such as, a display (e.g., first or second display 204, 206), a keyboard, or another device. As previously described herein, each of the first and second walls 406, 408 can have a respective height (see FIGS. 7A and 7B) which can be different or equivalent. In some examples the first wall 406 can be substantially parallel to the second wall 408 such that the cross sectional shape of the channel 410 is rectangular or square. In some examples, one or both of the first and second walls 406, 408 can be magnetic to retain a device (e.g., display 204) within the channel 410. In some examples, the first retaining portion 402 can include one or more magnets which removably retain the device within the channel 410.

Like the first retaining portions 402, the second retaining portion 404 can also include first and second walls 412, 414 that form a channel 416 extending between the first and second walls 412, 414. The channel 416 can receive a portion of a device, such as, a display (e.g., first or second display 204, 206) keyboard, or other device. As previously described herein, each of the first and second walls 412, 414 can have a respective height (see FIG. 6) which can be different or equivalent. In some examples the first wall 412 can be substantially parallel to the second wall 414 such that the cross sectional shape of the channel 416 is rectangular or square. In some examples, one or both of the first and second walls 412, 414 can be magnetic to retain a device (e.g., display 204) within the channel 416. In some examples, the second retaining portion 404 can include one or more magnets which removably retain the device within the channel 416.

The intermediate portion 418 can form an elongated member defining a first recess 420 and a second recess 422. In some examples, the first and second recesses 420, 422 can be formed within respective side surfaces 428 of the intermediate portion 418, as shown in FIGS. 8A-8D. The first retaining portion 402 can include a first pivot member 432 configured to be positioned within the first recess 420. The second retaining portion 404 can include a second pivot member 434 configured to be positioned within the second recess 422.

The first and second pivot members 432, 434 can couple or interlock the first and second retaining portions 402, 404 to the intermediate portion 418 such that each pivot member 432, 434 can independently rotate relative to the intermediate portion 418. For example, each of the first and second pivot members 432, 434 can define respective rotational axis about which the first and second retaining portions 420, 404 can rotate or pivot. While the examples depicted in FIGS. 8A-8D illustrate the intermediate portion 418 having first and second recesses 420, 422 within respective side surfaces 428, the intermediate portion 418 can include recesses in the top surface 426 or the bottom surface 430 of the intermediate portion 418 in other examples.

The intermediate portion 418 can form or define a cavity 436 configured to receive at least a portion of the second wall 408 of the first retaining portion 402 when the coupling mechanism 400 is in a closed state. For example, the cavity 436 can have dimensions substantially similar to the dimensions of the second wall 408 to enable the second wall 408 to move within the cavity 436 when the first retaining portion 402 is rotated into a closed state.

In some examples, a cross-sectional shape of the intermediate portion 418 can be rectangular or square, however, the cross-sectional shape of the intermediate portion 418 can be other geometric shapes in other examples. For example, the cross-sectional shape of the intermediate portion 418 can be triangular, ellipsoidal, spherical, or any other geometric shape. The intermediate portion 418 can include a metal, metal alloy, polymer, or any other material capable of providing the functionality disclosed herein. For example, the intermediate portion 418 can include a 6000 or 7000 series aluminum having an oxidization layer formed thereon.

In some examples, the intermediate portion 418 can define an internal volume housing one or more sensors, computing components (e.g., a processing unit), a battery, and similar electrical components. For example, the intermediate portion 418 can house one or more batteries or inductive charging components within the internal volume to provide electrical power to one or more devices pivotally coupled to the coupling mechanism 400. As described herein, the coupling mechanism 400 can provide a communication pathway or conductive pathway that places devices (e.g., tablet computing devices) coupled to the coupling mechanism 400 in wireless and/or electrical communication. As such, the coupling mechanism 400 can provide a communication pathway that enables the devices to transfer power and or data between the devices.

Figure 9:
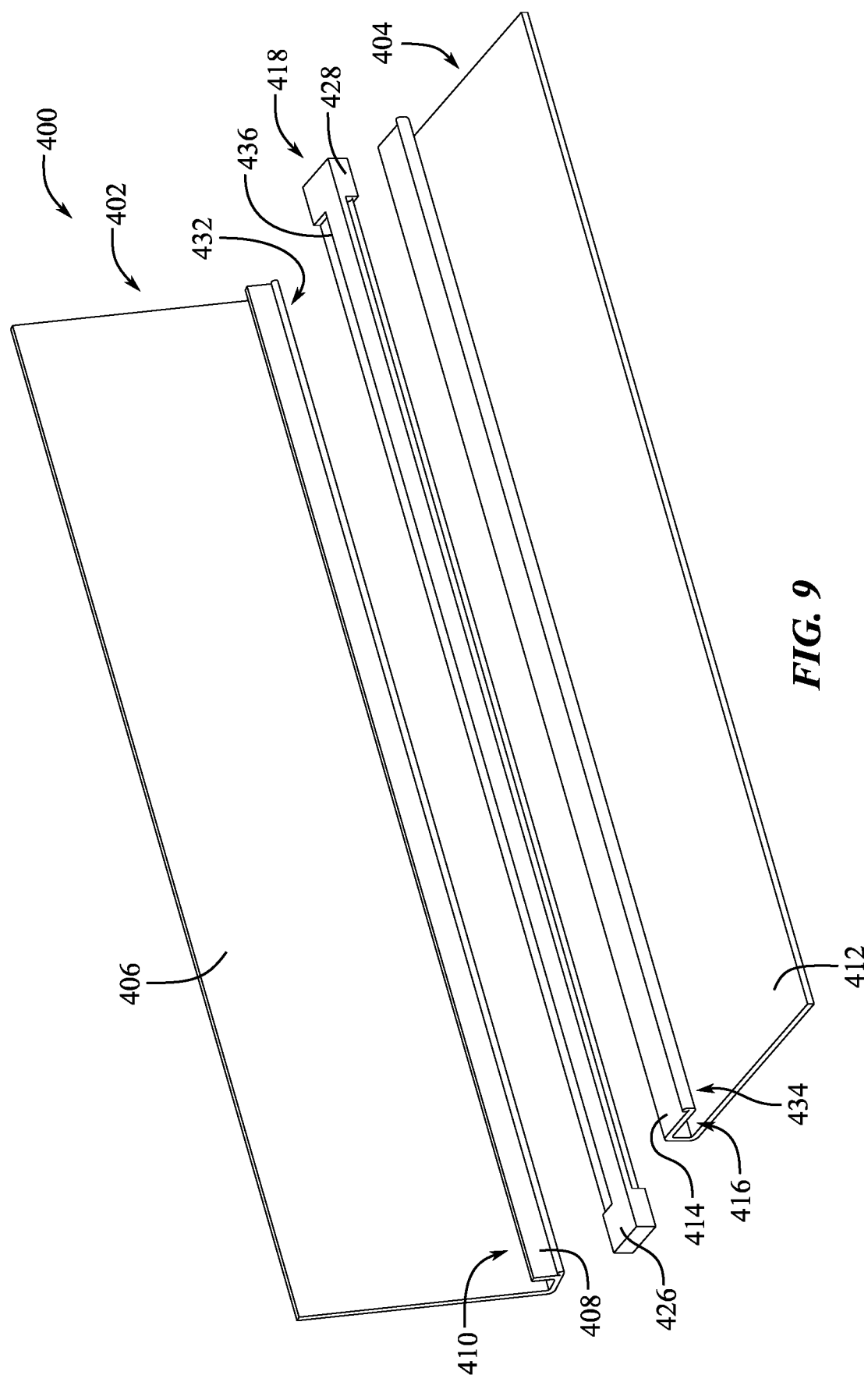
FIG. 9 shows an exploded view of the computing device of FIG. 8A.

FIG. 9 is an exploded view of the coupling mechanism 400 including the first and second retaining portions 402, 404 and intermediate portion 418. The respective hinge mechanisms used to pivotally couple the retaining portions 402, 404 to the intermediate portion 418 can be any mechanism now known in the art or as may be developed in the future. For example, the hinge mechanism can be a piano hinge, a living hinge, a barrel hinge, or another similarly functioning hinge. Non-limiting examples of a hinge are described in U.S. Pat. No. 9,450,289 issued Sep. 20, 2016, the disclosure of which is hereby incorporated by reference in its entirety.

Figure 10A:
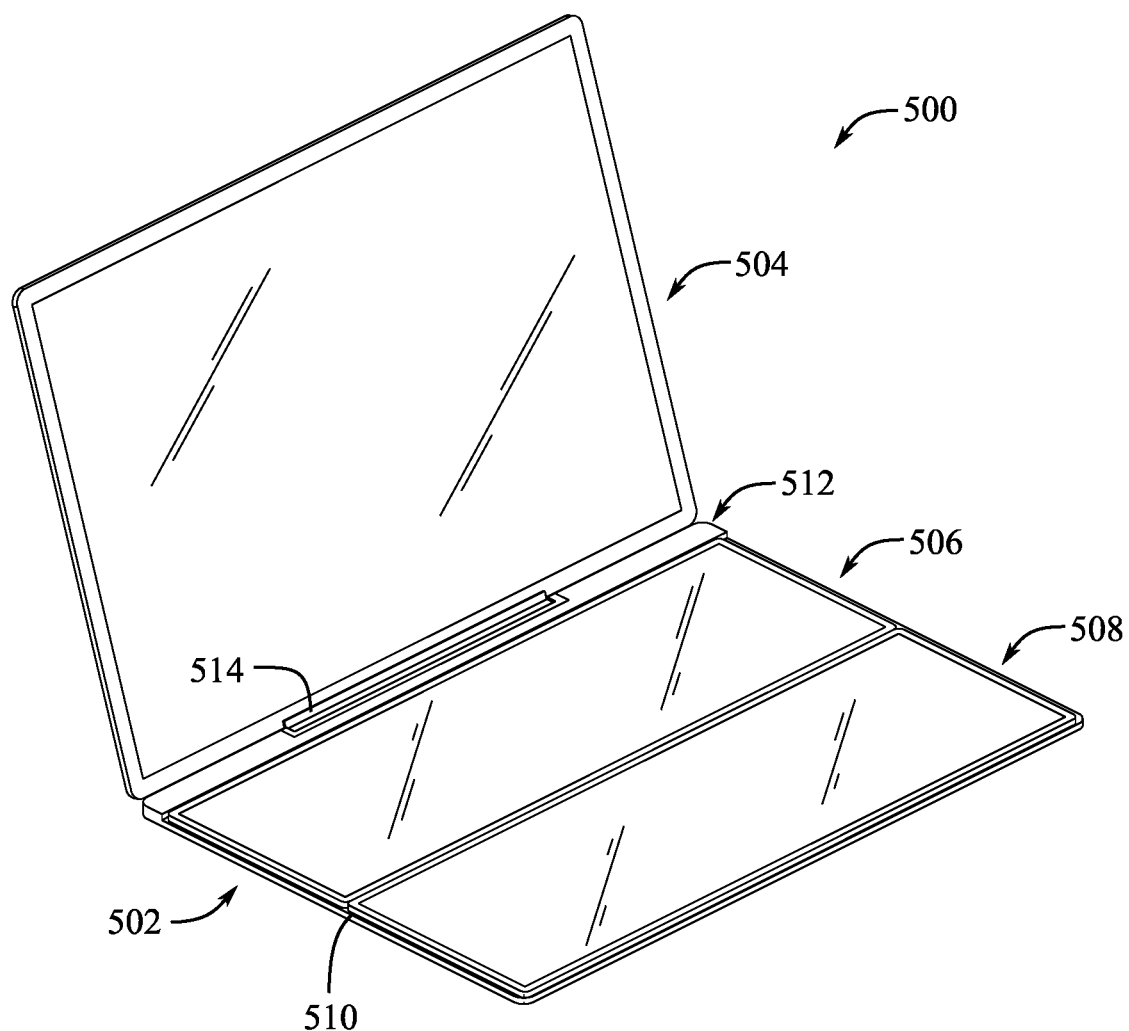
FIG. 10A shows a perspective view of a computing device.

Various examples of computing devices having a base configured to couple to one or more electronic devices are described below with reference to FIGS. 10-13. FIG. 10A shows an example of a computing device 500 including a base 502, a first display 504, a second display 506, and a third display 508. The computing device 500, the first display 504, the second display 506, and the third display 508 can be substantially similar to, and can include some or all of the features of the computing devices and displays or keyboards described herein. The first display 504 can be pivotably coupled to the base 502. Like the examples shown in FIGS. 1A-2C and 5A-7B, the first display 504 can be removably coupled to a hinge 514 of the base 502. The hinge 514 can be substantially similar to the hinges described herein and shown in FIGS. 1A-2C and 5A-7C. In some examples, the base 502 can be substantially similar to the base 102 depicted in FIGS. 1A-2C and 5A-7B. For example, like the base 102, the base 502 can define an input surface 510 (beneath the second and third displays 506, 508) and a raised portion 512.

As illustrated in FIG. 10A, the second and third displays 506, 508 can be positioned adjacent the input surface 510 of the base 502. While positioned adjacent the input surface 510, the second and third displays 506, 508 can provide input and output functionality to a user of the computing device 500. For example, the second display 506 can display secondary content (e.g., a webpage or email account) to the user while the third display 508 provides a virtual keyboard configured to receive input from a user of the computing device 500. As described herein, the second and third displays 506, 508 can be removably coupled to the input surface 510, for example, using one or more magnets within the base 502 or the display 506. In some examples, the third display 508 can be removed from the base 502 to expose a portion of the input surface 510. The exposed portion of the input surface 510 can be configured to receive touch input or near touch input from a user of the computing device 500. For example, the exposed portion of the input surface 510 can function as a track pad to enable a user to move a cursor on the first or second display 504, 506.

Figure 10B:
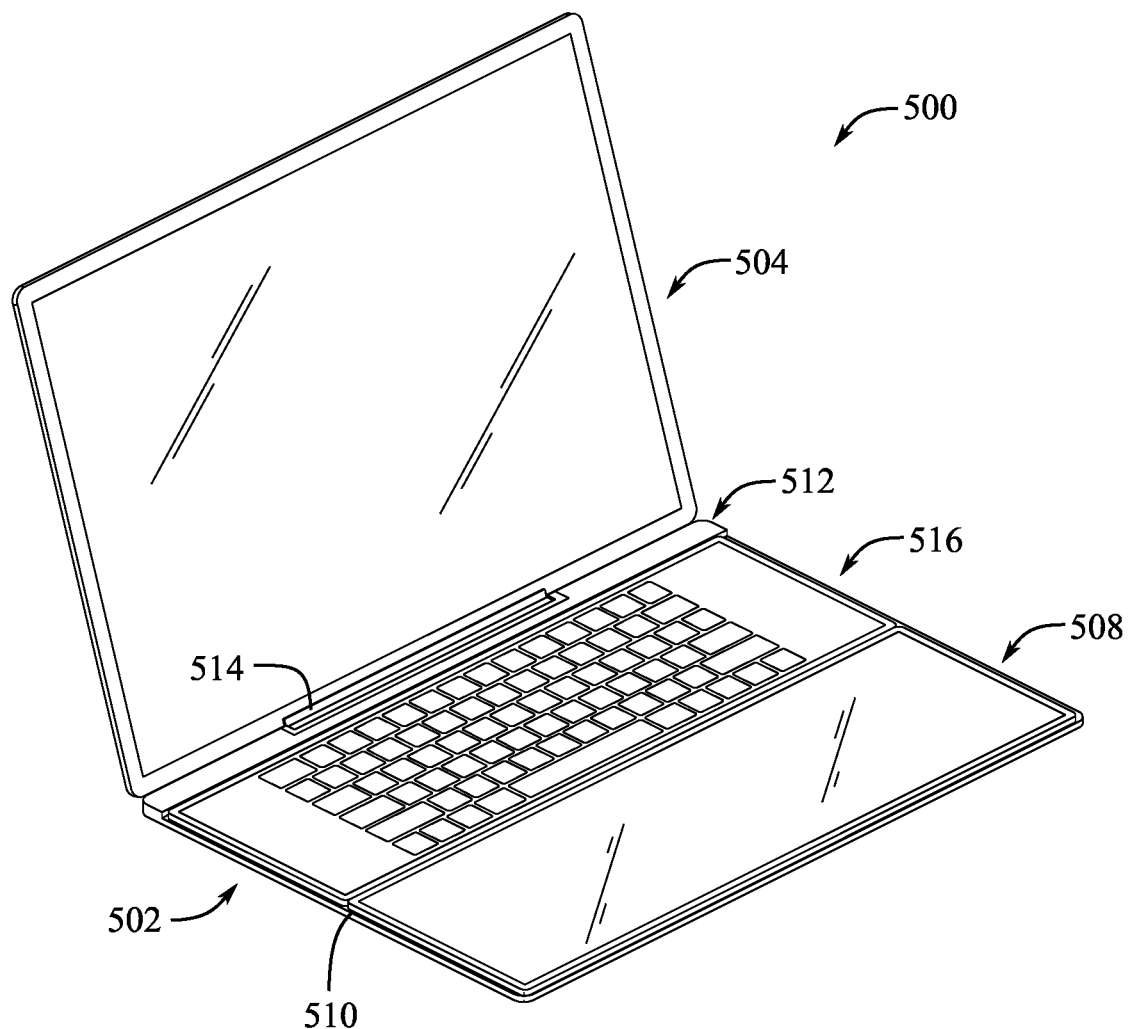
FIG. 10B shows a perspective view of the computing device of FIG. 10A in a closed state.

As illustrated in FIG. 10B, the computing device 500 can include a keyboard 516. The computing device 500, the first display 504, the keyboard 516, and the third display 508 can be substantially similar to, and can include some or all of the features of the computing devices and displays or keyboards described herein. The keyboard 516 and the third display 508 can be positioned adjacent the input surface 510 of the base 502. While positioned adjacent the input surface 510, the keyboard 516 and the third display 508 can provide input and output functionality to a user of the computing device 500. For example, the keyboard 516 can receive input from a user of the computing device 500. As described herein, the keyboard 516 and the third display 508 can be removably coupled to the input surface 510, for example, using one or more magnets within the base 502 or the keyboard 516. In some examples, the third display 508 can function as a track pad to replicate the functionality of a traditional laptop (e.g., display, keyboard, and track pad).

Figure 11A:
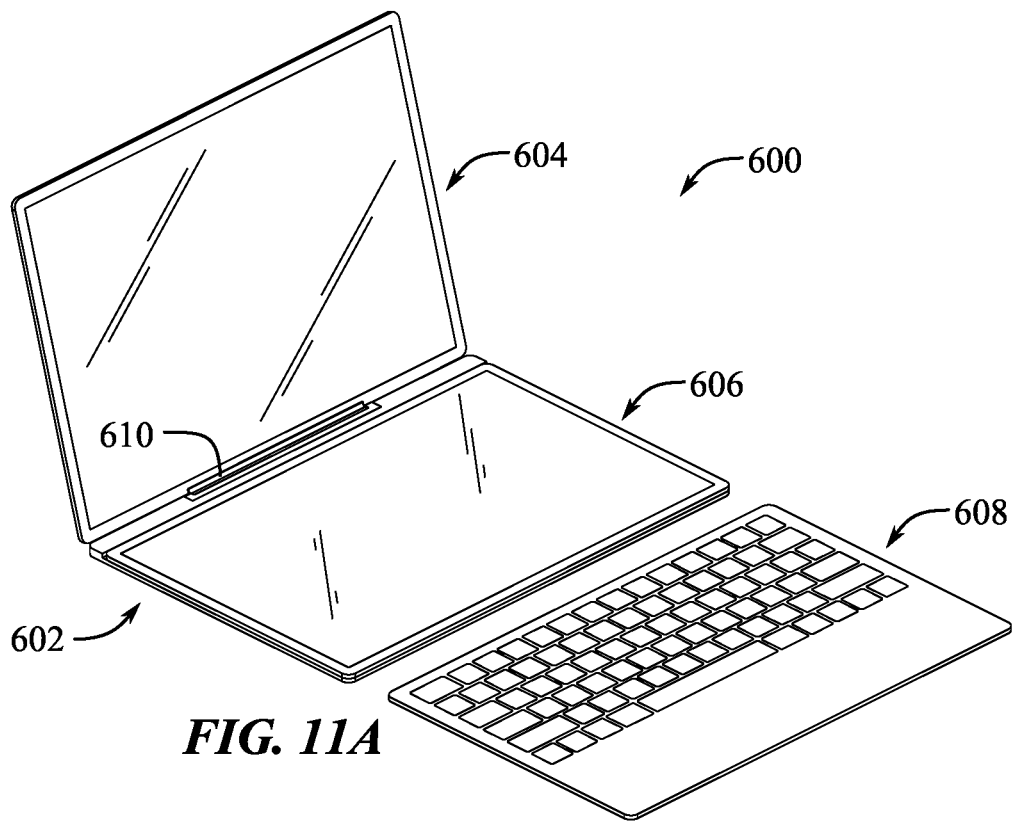
FIG. 11A shows a perspective view of a computing device in an assembled configuration.
Figure 11B:
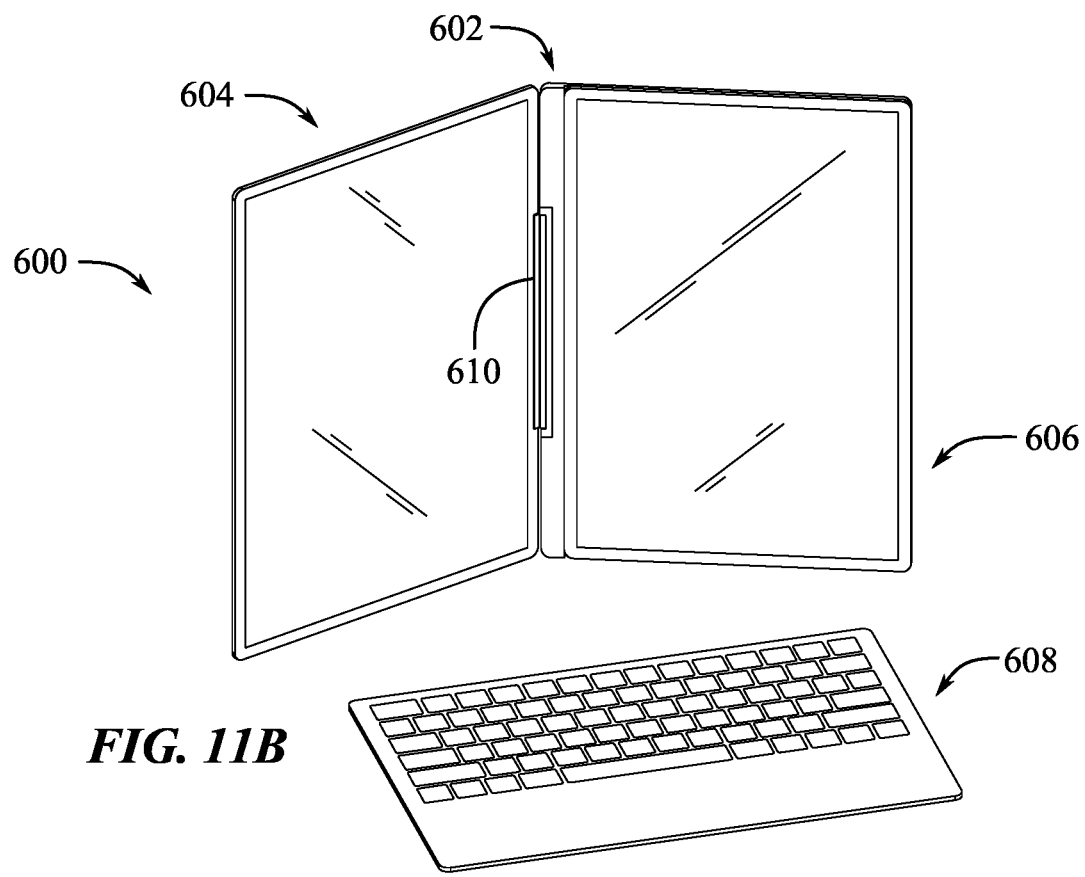
FIG. 11B shows a perspective view of the computing device of FIG. 11A in another configuration.

In some examples, the base can be repositionable to provide multiple configurations of use, as described in FIGS. 11A and 11B. FIGS. 11A and 11B show multiple example configurations of a computing device 600 including a base 602, a first display 604, a second display 606, and a keyboard 608. The computing device 600 can be substantially similar to any of the computing devices described herein, such as the computing devices 100, 300 shown in FIGS. 1A-2C and 5A-7B. FIG. 11A shows the computing device 600 in a configuration in which the base 602 is placed parallel to a support surface (e.g., a desk, table, lap of a user, or the like) and the first display is rotatably coupled to a hinge 610 of the base 602 at an oblique angle relative to the support surface. The second display 604 can be removably coupled to an input surface of the base 602 and substantially parallel to the support surface. In this configuration, the first display 604 can be the primary display while the second display 606 is the secondary display. The keyboard 608 can be communicatively coupled to at least one of the first or second displays 604, 606 or the base 602, for example, the keyboard 608 can be configured to wirelessly communicate through Bluetooth or another wireless communication standard. In some examples, the first and second displays 604, 606, and the keyboard 608 can be configured to receive input from a user to operate the computing device 600.

FIG. 11B shows another configuration of the computing device 600 in which the base 602, the first display 604, and the second display 606 are positioned perpendicular to the support surface. The first display 604 can be rotated about the base 602 such that the base 602 and first display 604 are self-supported in a standing position. In some examples, the first display 604 and the second display 606 can operate as a single display screen. In other words, content shown at the first display 604 can extend onto the second display 606 or can be dragged onto the second display 606 by a user of the computing device 600. This configuration can be beneficial, for example, when a user desires a computing device having a larger display screen. Alternatively or additionally, the first display 604 can depict a first content to the user while the second display 606 depicts a second content to the user. In some examples, the first and second displays 604, 606, and the keyboard 608 can be configured to receive input from a user to operate the computing device 600.

Figure 12A:
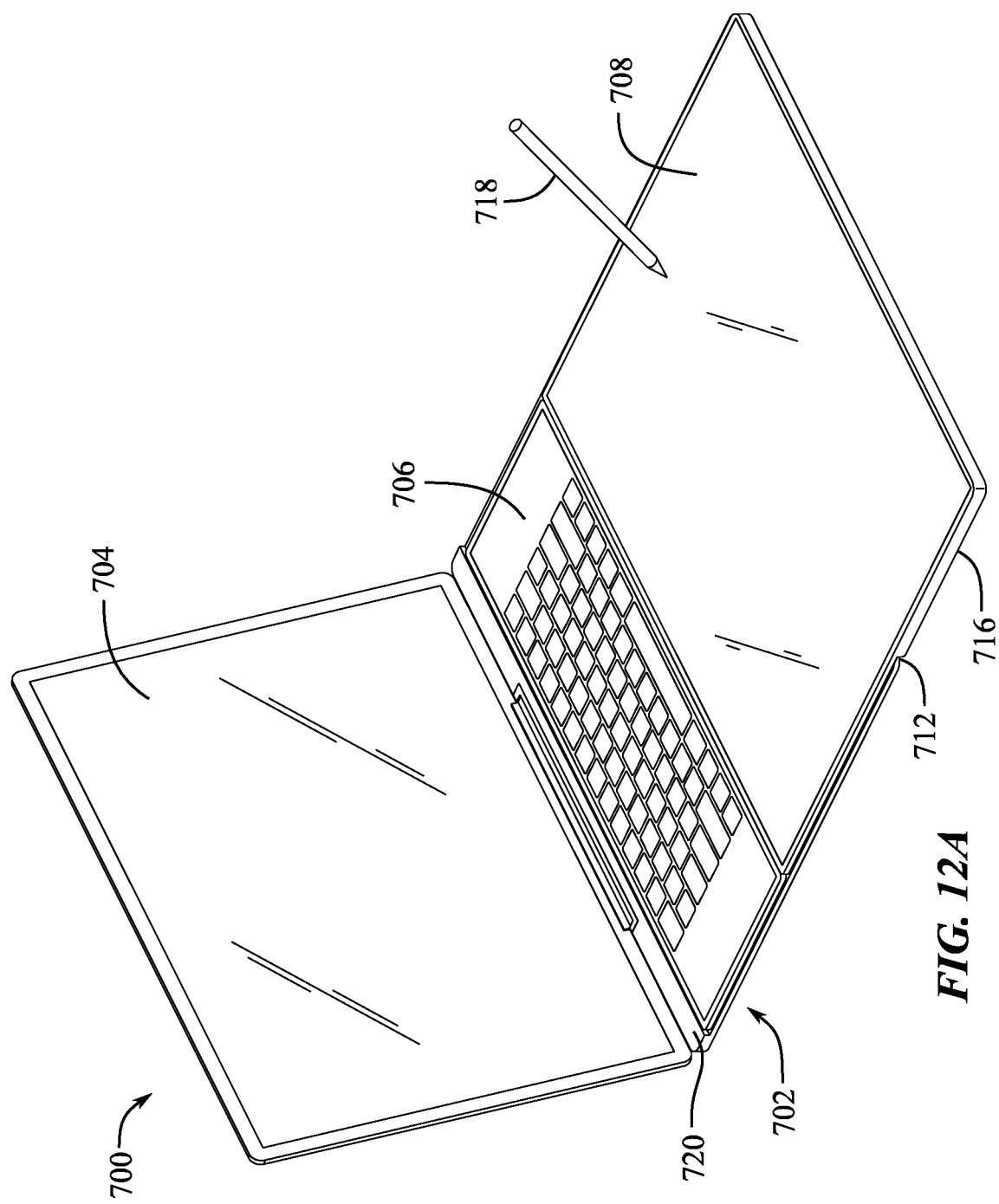
FIG. 12A shows a perspective view of a computing device.

In some examples, the computing device can include a base configured to simultaneously support and interface with multiple input devices, as described below with reference to FIGS. 12A and 12B. FIG. 12A shows an example computing device 700 including a base 702, a display 704, a keyboard 706 positioned on the base, and an input device 708 positioned on the base. The keyboard 706 can be substantially similar to keyboard 108 of FIGS. 1A-2C, and can include some or all of the features of the keyboard 108. The input device 708 can simultaneously occupy an input surface (e.g., input surface 308) of the base 702 with the keyboard 706. For example, the input device 708 can define an engagement surface 710 which contacts at least a portion of the input surface (e.g., input surface 308) of the base 702. The engagement surface 708 can be recessed such that a side wall 712 of the base 702 interfaces with a wall 714 of the input device 708 having a substantially similar size and shape as the side wall 712. The size and shape of the side wall 712 and the engagement surface 708 can cause a raised portion 720 of the base 702 to be flush with the keyboard 706 and the input device 708. The input device 708 can also form a base portion 716 that supports the input device 708 and extends flush with a bottom surface of the base 702. As such, the input device 708 can be positioned adjacent the keyboard 706 and can provide an extended or enlarged input area for the computing device 700.

One or more of power and/or data can be transferred through the engagement between the engagement surface 710 and the input surface of the base 702. In some examples, power and/or data can be transferred through a direct electrical connection. In some examples, power and/or data can be wireless transferred, for example, through inductive coupling or one or more wireless antennas or components. For example, the input device 708 can house one or more batteries which supply electrical power to the computing device 700. Additionally, or alternatively, the input device 708 can house one or more processors which supply processing capabilities to the computing device 700. In some examples, the input device 708 can function as a trackpad or sketching surface for a stylus 718 or other similar sketching tools.

Figure 12B:
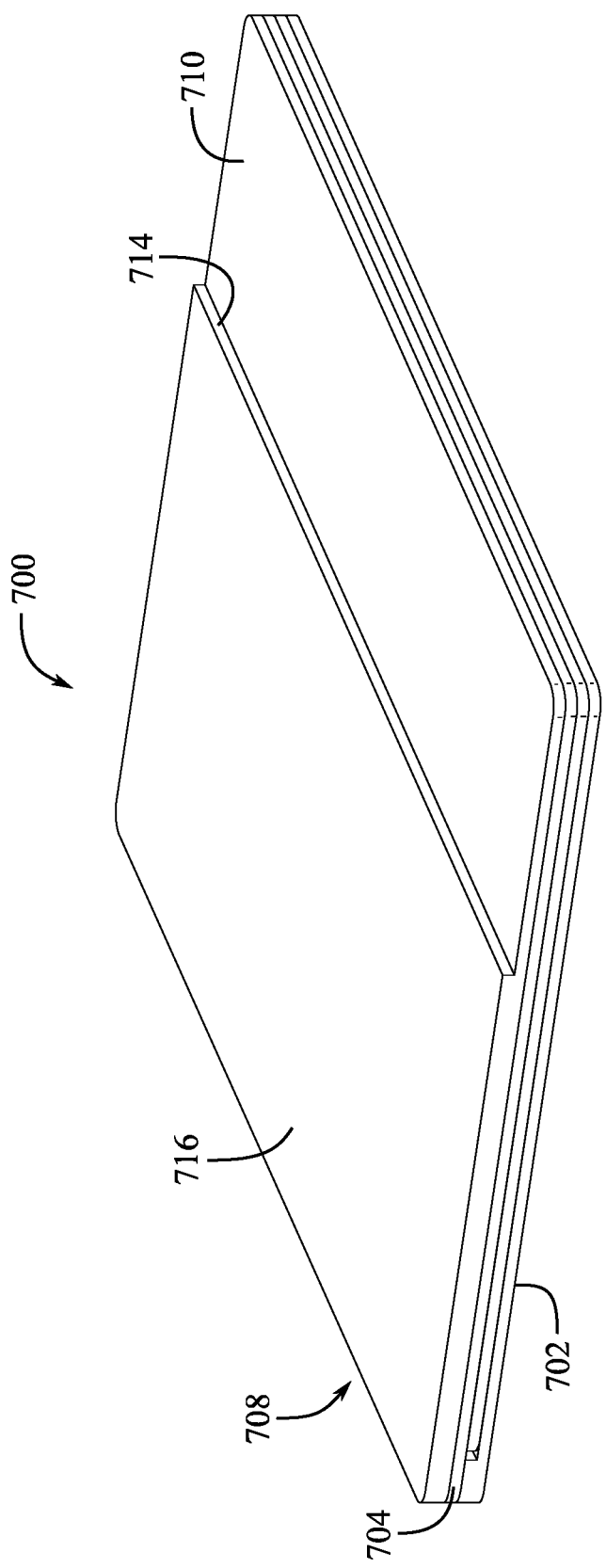
FIG. 12B shows a perspective view of the computing device of FIG. 12A arranged in another configuration and in a closed state.

FIG. 12B shows the computing device 700 of FIG. 12A in a closed state arranged in a configuration wherein the input device 708 is positioned on the display 704. As illustrated in FIG. 12B, the keyboard 706 can be positioned between the base 702 and the display 704 while the computing device 700 is in a closed state. While the computing device 700 is in a closed state and the keyboard 706 is positioned between the base 702 and the display 704, the display 704 and/or the input device 708 can be deactivated or non-functioning to prevent unintentional or accidental input to the computing device 700. By positioning the keyboard 706 between the base 702 and the display 704, the keyboard 706 can be protected or shielded from potential damage when transporting the computing device 700. Moreover, the display 704 can be protected or shielded from damage by the input device 708.

If the computing device 700 is opened by a user to an open state, the display 704 and/or the keyboard 706 can be activated or rendered operable. The input device 708 can be removably affixed to the display 704, for example, by one or more magnets positioned within the display 704 and/or the input device 708. In some examples, the display 704 can include metal that interacts with one or more magnets within the input device 708 to removably couple the input device 708 to the display 704.

In some examples, the component positioned on the first display 704 (e.g., the second display 708 in FIG. 12A or the keyboard 706 in FIG. 2C) can remain affixed to the first display 704 while the computing device 700 is opened by a user, and can remain affixed while the computing device 700 is left in an open state. Although reference has been made to the first and second displays 704, 708 in particular positions within the computing device 800, the first display 704 can be substituted for the second display 708, and vice versa. For example, the relative positions and functions of the first and second displays of FIG. 12A can be swapped such that the first display 704 is positioned outside of the closed computing device 700.

Figure 13:
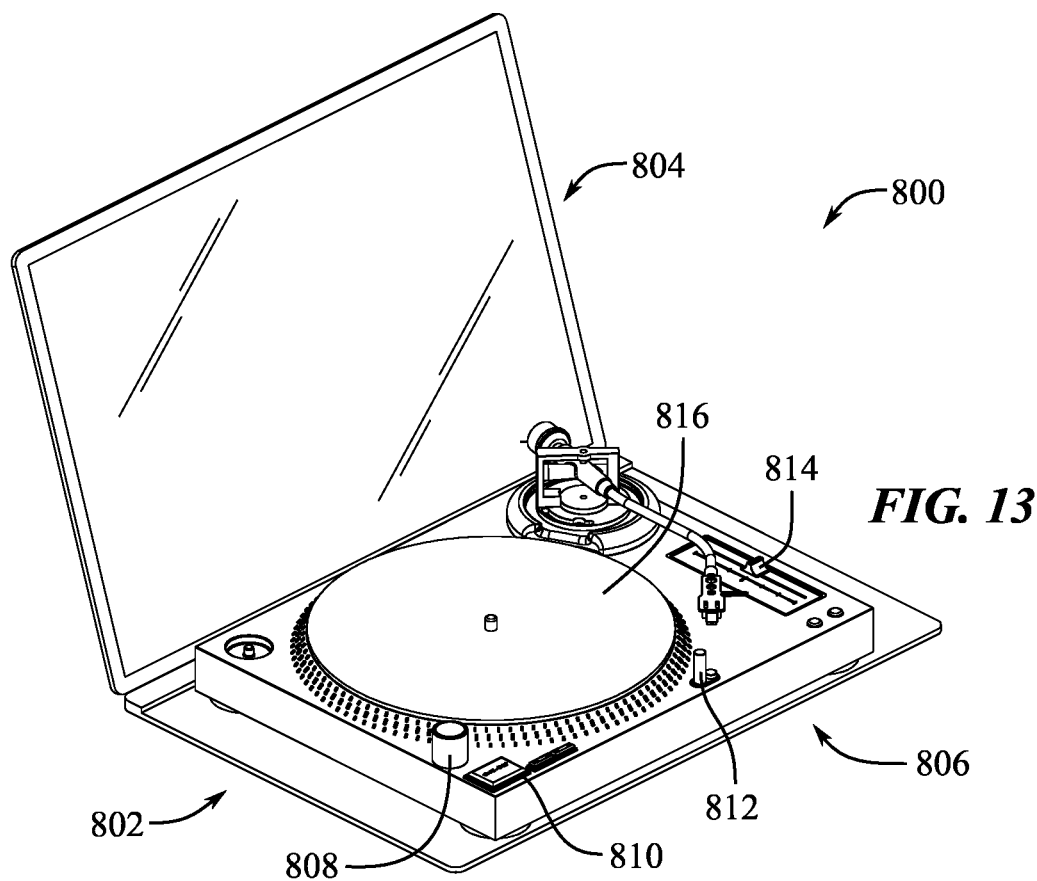
FIG. 13 shows a perspective view of a computing device including an input device.

In some examples, the computing device can include a base configured to interface with other input devices, as described below with reference to FIGS. 13 and 14. FIG. 13 shows an example computing device 800 including a base 802, a display 804, and an input device 806 positioned on the base 802. The computing device 800 can be substantially similar to and include some or all of the features of any of the computing devices described herein. The input device 806 can be configured to provide input to the computing device 800, for example, the input device 806 can be communicatively coupled to at least one of the base 802 or the display 804. Thus, the input device 806 can include a variety of input mechanisms which are detectable by the base 802 and/or the first display 804, for example, via an electrical or wireless communication with the base 802 and/or first display 804, or through sensors in the base 802, for example, as described with respect to the base 302. In some examples, the input device 806 can include at least one of a knob 808, a button 810, a toggle 812, a slider 814, a turntable 816, or other input mechanisms (e.g., dials, switches, levers, and piano keys) configured to provide input to the base 802 or display 804 to control operational aspects of the computing device 800. The computing device 800 can be utilized by a music producer, a disc jockey, an audio engineer, or the like to generate music in one configuration while also being modular to permit the user to remove the input device 806 and removably attach a keyboard or second display (not shown) to the base 802 to provide traditional laptop functionality. Thus, the computing device 800 be reconfigurable or modular to efficiently accommodate users in various operational applications (e.g., music productions, sketching, document preparation, online shopping, video conferencing, and so on).

Figure 14:
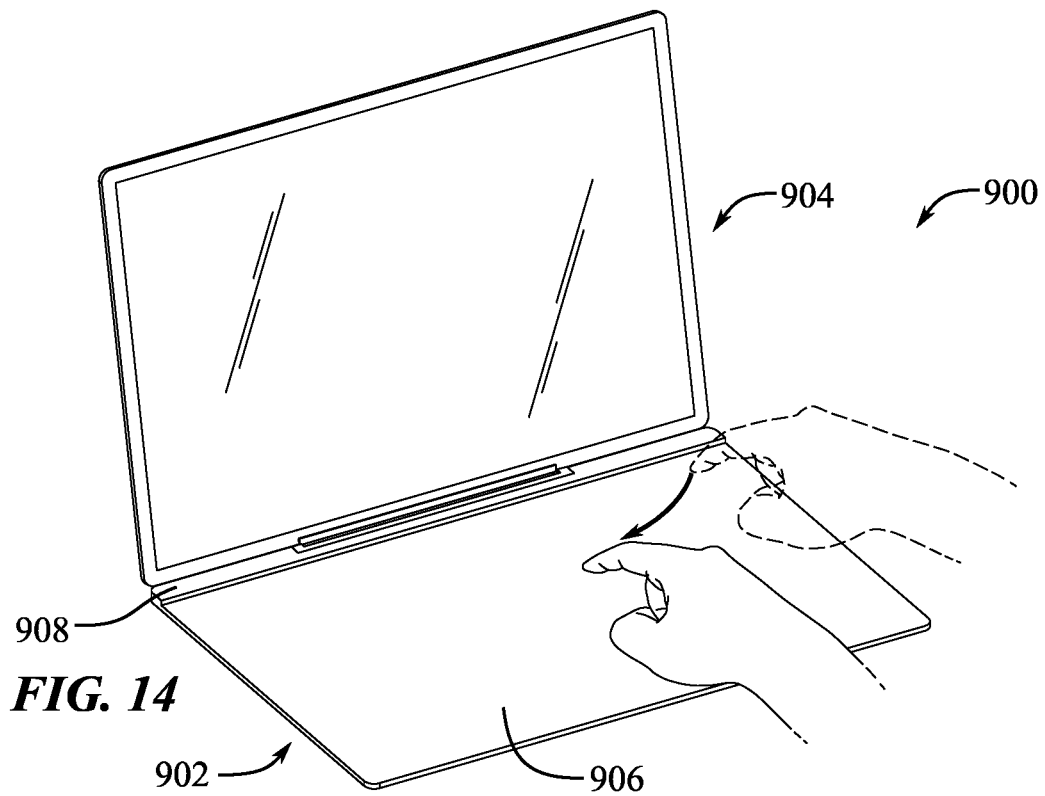
FIG. 14 shows a perspective view of a computing device.

FIG. 14 depicts an example of a computing device 900 including a base 902 and a display 904. The base 902 can be substantially similar to the other bases described herein, such as depicted in FIGS. 1A-2C, 5A-7B, and 10-13. For example, like the other bases, the base 902 can define an input surface 906 and a raised portion 908. The input surface 906 can be configured to receive input from the user of the computing device 900, such as touch input or near touch input at the input surface 906. Additionally, or alternatively, the computing device 900 can detect user gestures at or above the input surface 906. As illustrated in FIG. 14, a user can make a gesture with their hand or another object which is detectable by the computing device 900. For example, the raised portion 908 can include a plurality of sensors configured to detect movement above the input surface 906. The example gesture depicted in FIG. 14 illustrates a user turning or flipping a virtual page of a book or magazine being displayed at the display 904. Other gestures can be recognized by the computing device 900, for example, pinch/zoom gestures, swiping gestures, scrolling gestures, and/or rotating gestures.

Figure 15A:
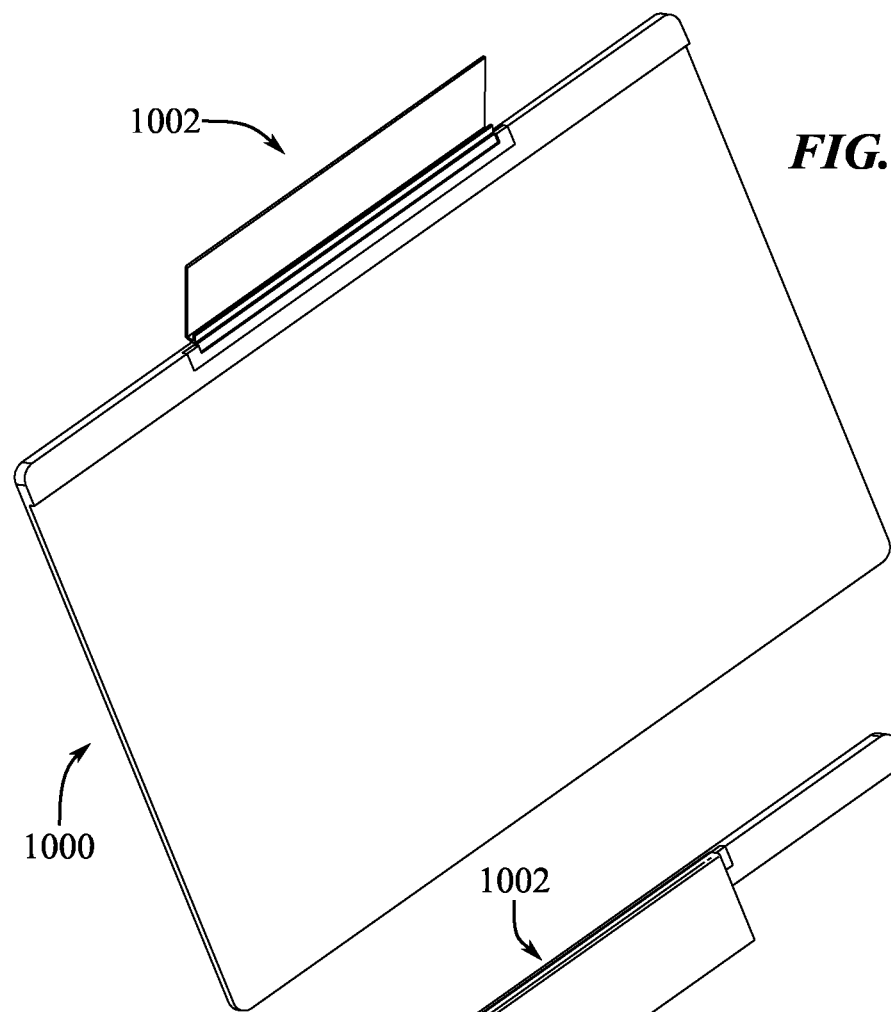
FIG. 15A shows a perspective view of a computing device having a hinge in an open state.
Figure 15B:
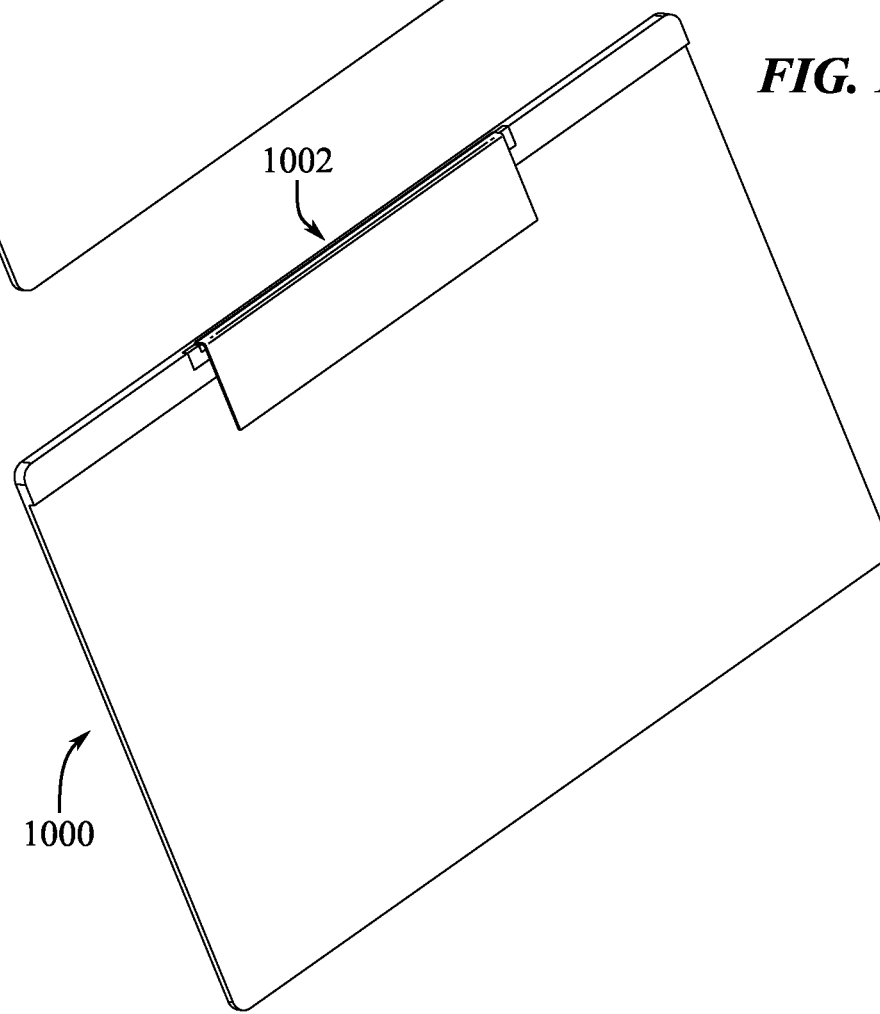
FIG. 15B shows a perspective view of a computing device having a hinge in a closed state.

In some examples, the base can include a hinge which is rotatably coupled to the base as described below with reference to FIGS. 15A and 15B. FIGS. 15A and 15B illustrate an example of a base 1000 having a hinge 1002. The hinge 1002 is illustrated in an opened state in FIG. 15A and in a closed state in FIG. 15B. The hinge 1002 can include substantially similar features and functionality as the hinges depicted in FIGS. 1A-2C, 5A-7B, and 10-13. For example, the hinge 1002 can be configured to removably couple to an electronic device (e.g., a tablet computing device) and rotate the electronic device relative to the base 1000. In some examples, the hinge 1002 can be rotated from an angle of 0 degrees relative to the base 1000 (i.e., a closed state as shown in FIG. 15B) to a an angle between about 0 degrees and about 180 degrees relative to the base 1000 (i.e., an opened state as shown in FIG. 15A).

Figure 16A:
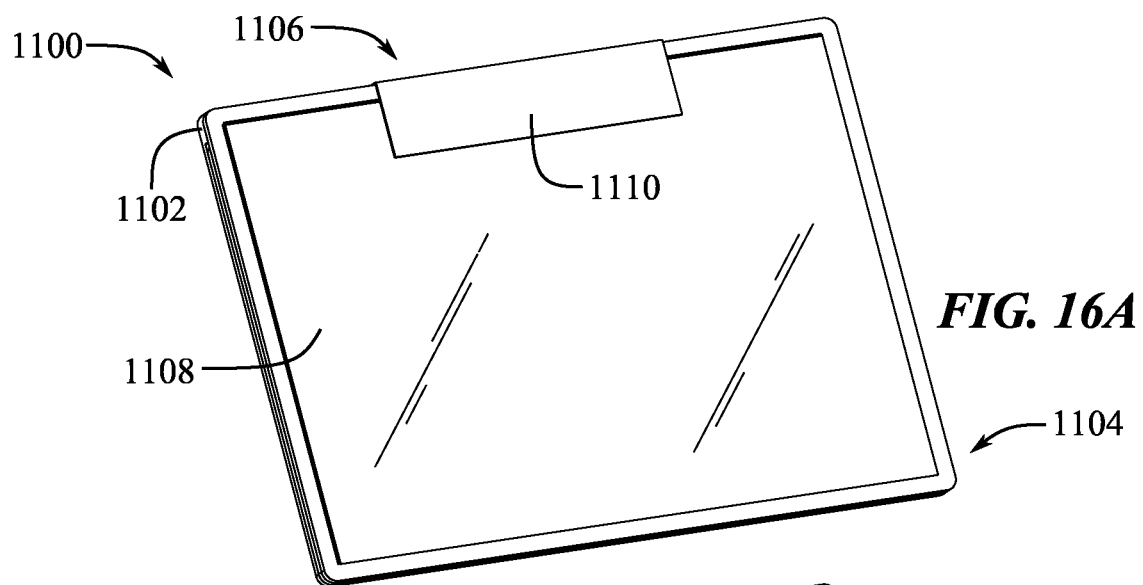
FIG. 16A shows a perspective view of a computing device in a closed state.
Figure 16B:
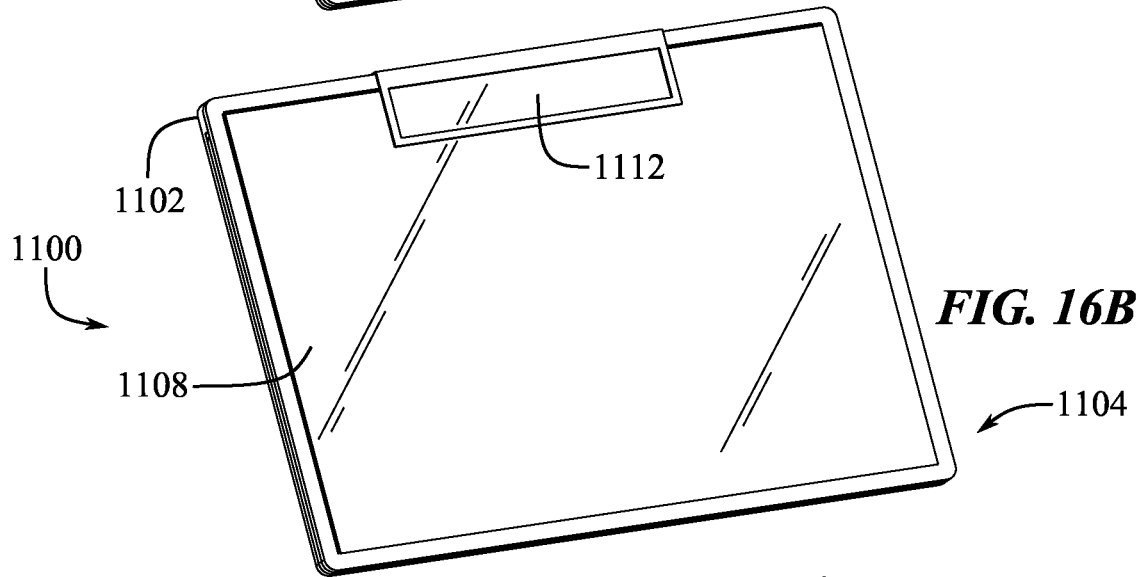
FIG. 16B shows a perspective view of a computing device in a closed state.
Figure 16C:
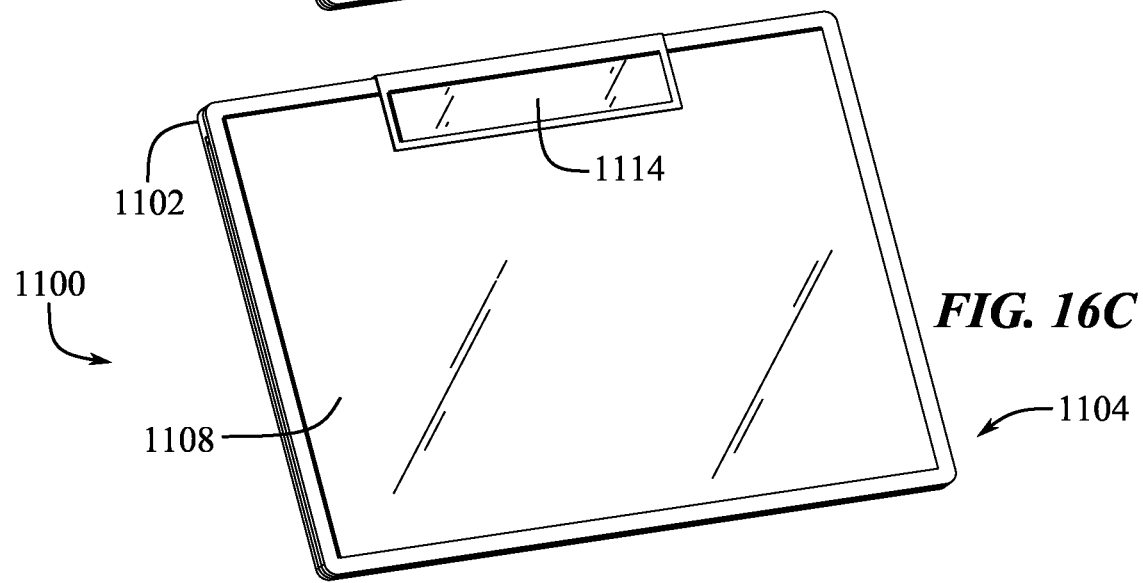
FIG. 16C shows a perspective view a computing device in a closed state.

Various examples of hinges of a computing device are described below with reference to FIGS. 16A-16C. FIGS. 16A-16C show a computing device 1100. The computing device 1100 can be substantially similar to and include some or all of the features of any of the computing devices described herein. The computing device 1100 can include a base 1102, a display 1104, a hinge 1106, and another device (not shown) positioned between the base 1102 and the display 1104. As shown, the display 1104 can be positioned such that a display screen 1108 of the display 1104 is facing away from the base 1102. While in this configuration, a first wall 1110 of the hinge 1106 can obstruct or block a portion of the display screen 1108 (as shown in FIG. 16A). Significant obstruction of the display screen 1108 can be undesirable to a user of the computing device 1100. Thus, the hinge 1106 can include various features provide an active display area at the hinge 1106 (as shown in FIGS. 16B and 16C). In some examples, as shown in FIG. 16B, the hinge 1106 can include a window 1112 formed within the first wall 1110 that enables a user of the computing device 1100 to view a significant portion of the display screen 1108 that would have otherwise been obstructed by the first wall 1110.

In some examples, as shown in FIG. 16C, the hinge 1106 can include a sub-display 1114 positioned adjacent the first wall 1110 and configured to replicate or reproduce the portion of the display screen 1108 that is obstructed by the first wall 1110. Additionally or alternatively, the sub-display 1114 can be configured to display additional content, for example, a time of day, a current date, a current battery level of the computing device 1100, a volume setting, open application icons, other content, or combinations thereof.

The sub-display 1114 can be any form of display, component, or device used to display visual content to a user. For example, in some examples the sub-display 1114 can be an LED display, an OLED display, or an LCD display. In some examples, the sub-display 1114 can be any form of display now known in the art or as may be developed in the future. In some examples, the sub-display 1114 can be a touch screen display, or can have touch detecting capabilities, such as, capacitive touch, force touch, and near touch capabilities.

Any of the features or aspects of the computing devices discussed herein can be combined or included in any combination. For example, a computing device can include a base and one or more displays and/or keyboard attached thereto. The one or more displays and/or keyboard can be rotatable relative to the base and removably attached to one or more retaining portions. Further, the components of the computing devices described herein, including components that can be fully or partially removable, can be housed entirely within an internal volume. For example, an internal volume defined by the base.

Any of the features or aspects of the computing devices discussed herein can be combined or included in any combination. For example, a computing device can include a coupling mechanism and one or more displays and/or keyboard attached thereto. The one or more displays and/or keyboard can be rotatable relative to the coupling mechanism and removably attached to one or more retaining portions. Further, the components of the computing devices described herein, including components that can be fully or partially removable, can be housed entirely within an internal volume. For example, an internal volume defined by the intermediate portion of the coupling mechanism.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness, or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A computing device comprising:
    a base defining:
        an internal volume;
        an input surface; and
        a raised portion defining a cavity, the raised portion defining:
            a rear surface;
            a top surface extending between the rear surface and the input surface; and
            a side wall extending between the top surface and the input surface;
    computing components disposed in the internal volume;
    a hinge comprising a retaining portion and a pivot member, the pivot member rotatably attaching the retaining portion to the base, the retaining portion defining a channel sized to removably receive and retain a display housing.

2. The computing device of claim 1, wherein the retaining portion comprises a first retaining side wall and a second retaining side wall, the first retaining side wall and the second retaining side wall defining the channel.

3. The computing device of claim 1, further comprising a keyboard removably attached to the input surface.

4. The computing device of claim 1, wherein the display is a first display, and the computing device further comprises a second display removably attached to the input surface.

5. The computing device of claim 1, wherein the base comprises a component retention magnet.

6. The computing device of claim 1, wherein the side wall comprises an input component alignment portion.

7. The computing device of claim 1, further comprising a sensor disposed in the internal volume to detect a user input.

8. The computing device of claim 7, wherein:
    the sensor comprises a capacitive touch sensor; and
    the sensor is disposed in the internal volume below a portion of the base defining the input surface.

9. The computing device of claim 7, further comprising a light emitting component disposed in the internal volume;
    wherein the sensor receives light emitted by the light emitting component and reflected off an object to detect a location of the object.

10. The computing device of claim 7, wherein the sensor detects a position and a motion of an extremity of a user in a region adjacent to the input surface.

11. An electronic device, comprising:
    a body at least partially defining an internal volume;
    computing components disposed in the internal volume;
    a retaining portion comprising a first wall and a second wall, the first wall and the second wall at least partially defining a channel sized to receive and retain a housing of a display; and
    a pivot member rotatably coupling the retaining portion to the body;
    wherein the body defines:
        an input surface;
        a cavity sized to receive the second wall; and
        a raised portion extending between the cavity and the input surface.

12. The electronic device of claim 11, further comprising a display retention magnet positioned adjacent to the channel.

13. The electronic device of claim 11, wherein a height of the first wall is larger than a height of the second wall.

14. The electronic device of claim 11, wherein the computing components comprise a battery, a processor, and a memory.

15. The electronic device of claim 11, further comprising an inductive charging coil disposed in the internal volume.

16. An electronic device, comprising:
    a first retention portion having a first wall and a second wall defining a channel sized to removably receive and retain a housing of a display;
    a second retention portion to removably retain an input component; and
    an intermediate portion positioned between the first retention portion and the second retention portion, the first retention portion and the second retention portion being rotatably coupled to the intermediate portion, the intermediate portion defining an internal volume and a cavity sized to receive the second wall; and
    computing components disposed in the internal volume.

17. The electronic device of claim 16, where the first retention portion comprises a magnet.

18. The electronic device of claim 16, wherein the display is a first display and at least one of the first retention portion or the second retention portion comprises a second display.

19. The electronic device of claim 16, wherein the first retention portion and the second retention portion are independently rotatable relative to the intermediate portion.

* * * * *